(12) United States Patent
Penick

(10) Patent No.: US 7,195,799 B2
(45) Date of Patent: Mar. 27, 2007

(54) POLYMER COMPOSITION FOR TRACTION ON ICE

(75) Inventor: Mark Andrew Penick, San Antonio, TX (US)

(73) Assignee: The Board of Regents of the University of Texas System, Austin, TX (US)

( * ) Notice: Subject to any disclaimer, the term of this patent is extended or adjusted under 35 U.S.C. 154(b) by 172 days.

(21) Appl. No.: 10/896,377

(22) Filed: Jul. 21, 2004

(65) Prior Publication Data

US 2005/0070681 A1 Mar. 31, 2005

Related U.S. Application Data

(60) Provisional application No. 60/489,152, filed on Jul. 22, 2003.

(51) Int. Cl.
 *B05D 3/10* (2006.01)
(52) U.S. Cl. .................. 427/397.7; 524/261; 524/323
(58) Field of Classification Search ............. 427/397.7; 524/261, 323
See application file for complete search history.

(56) References Cited

U.S. PATENT DOCUMENTS

| | | | | |
|---|---|---|---|---|
| 2,878,235 | A | * 3/1959 | Butler et al. ................ | 528/347 |
| 2,929,427 | A | * 3/1960 | Cousins ..................... | 152/211 |
| 3,928,270 | A | * 12/1975 | South, Jr. .................. | 524/321 |
| 4,427,831 | A | 1/1984 | Komuro et al. ............. | 525/211 |
| 4,918,142 | A | 4/1990 | Saito et al. ................. | 525/99 |
| 5,530,040 | A | * 6/1996 | Ross ......................... | 524/73 |
| 5,681,874 | A | 10/1997 | Lucas et al. ................ | 523/212 |
| 5,777,063 | A | * 7/1998 | Gordon et al. .............. | 528/74 |
| 5,788,786 | A | 8/1998 | Yamauchi et al. .......... | 152/209 |
| 5,833,779 | A | 11/1998 | Van der Meer et al. .... | 152/209 |
| 5,873,399 | A | 2/1999 | Ochi ......................... | 152/209 |
| 5,929,156 | A | 7/1999 | Fultz et al. ................. | 524/492 |
| 5,967,211 | A | 10/1999 | Lucas et al. ............... | 152/209.4 |
| 6,003,595 | A | 12/1999 | Watanabe ................... | 165/299 |
| 6,021,831 | A | 2/2000 | Yamauchi et al. ......... | 152/209.7 |
| 6,024,824 | A | 2/2000 | Krech ........................ | 156/279 |
| 6,026,875 | A | 2/2000 | Diensthuber et al. ...... | 152/209.2 |
| 6,228,908 | B1 | 5/2001 | Takeich et al. ............. | 524/27 |
| 6,250,354 | B1 | 6/2001 | Kawai ........................ | 152/209.18 |
| 6,258,201 | B1 | 7/2001 | Krech ........................ | 156/279 |
| 6,303,388 | B1 | 10/2001 | Fahy ......................... | 436/518 |
| 6,378,584 | B1 | 4/2002 | Mizuno et al. ............ | 152/209.4 |
| 6,497,261 | B1 | 12/2002 | Fukushima et al. ....... | 152/209.4 |
| 2002/0026003 | A1 | 2/2002 | Tahara et al. .............. | 524/494 |
| 2003/0037950 | A1 | 2/2003 | Lambiaso ................... | 174/58 |

FOREIGN PATENT DOCUMENTS

| GB | 1 355 056 | * 5/1974 |
|---|---|---|
| JP | 2002-128959 | * 5/2002 |

OTHER PUBLICATIONS

"Dartmouth News," http://www.dartmouth.edu/~news/releases/2001/mar01/petrenko.html.
"Ice Technology," http://www.torvec.com/products_ice.html.
"Sheets of six-membered rings," *Dana's New Mineralogy*, 8th Ed., 1405, 1444-1451, 1997.
"Shoe-grip," http://www.shoplifestyleonline.com.
"Solar E-Clips: Tyre Grip," http://www.autoshades.com/products/tyre.html.
"Tyre-grip," http://www.tiregrip.com.
"Victor F. Petrenko," http://engineering.dartmouth.edu/thayer/faculty/victorpetrenko.html.
Beaglehole and Nason, "Transitional Layers On The Surface On Ice," *Surface Science*, 96:357-363, 1980.
Birknes, *Acta Cryst.*, "An Antihistaminic Agent: Soventol Hydrochloride Monohydrate Ethanol Solvate," B33:2301-2303, 1977.
*Crystal Structures*, 2nd Ed., 1:322-323, 1963.
Dear et al., "Rock-forming minerals," *Geological Society of London*, 2nd ed., 2B:751-756, 1997.
Evans and Mrose, "The crystal chemistry of the hydrous copper silicates, shattuckite and plancheite," *American Mineralogist*, 62:491-502, 1977.
Fahy et al., "Vitrification," *ASME*, 113-146, 1988.
Fleet, "The crystal structure of deerite," *American Mineralogist*, 62:990-998, 1977.
Franks, "The Properties of Ice," *Water, A Comprehensive Treastise*, 1:119, 1972.
Frazier et al., "An inherently fibrous polymer," *Inorganic Chemistry*, 6(9):1693-1696, 1967.
Harrison et al., "Ice growth in supercooled solutions of antifreeze glycoprotein," *Nature*, 328:241-243, 1987.
Haymet et al., "Winter flounder 'antifreeze' proteins: synthesis and ice growth inhibition of analogues that probe the relative importance of hydrophobic and hydrogen-bonding interactions," *JACS*, 121:941-948, 1999.
Hefner and Kenny., "Fibrous organosilicon polymers derived from silicates," In: *Soluble Silicates*, ACS Symposium Series, 20:319-328, 1982.
Jones et al., "Fibrous organosilicon polymers derived from silicates," *Acta Cryst.*, B35:1732-1735, 1979.
Karim and Haymet, "The ice/water interface: a molecular dynamics simulation study," *J. Chem. Phys.*, 89(11):6889-6896, 1988.
Klein and Hurlburt, Jr., "Systematic mineralogy," In: *Manual of Mineralogy*, 20th Ed., 422-423, 1985.
Knight et al., In: *Adsorption of Biomolecules to Ice and Their Effects Upon Ice Growth*, Crystal Growth and Design, 1(6):429-438, 2001.
Knight et al., "Fish antifreeze protein and the freezing and recrystallization of ice," *Nature*, 308:295-296, 1984.

(Continued)

*Primary Examiner*—Kuo-Liang Peng
(74) *Attorney, Agent, or Firm*—Fulbright & Jaworski L.L.P.

(57) ABSTRACT

The present invention provides a composition comprising a polymer and methods of using the composition to increase the traction of an article of manufacture on an icy surface. The polymer can be a silicate polymer, a plancheite-derived polymer, a pinacol polymer, an indanol polymer, a phenol polymer, or an m-xylylene polymer.

47 Claims, 18 Drawing Sheets

OTHER PUBLICATIONS

Nordenson and Jeffrey, "Pyrdyl 1-Thio-β-D-glucopyranoside monohydrate," *Acta Cryst.*, B36:1214-1216, 1980.

Rubinsky et al., "Ice-crystal growth and lectins," *Nature*, 360:113-114, 1992.

Sicherl and Yang, "Ice-binding structure and mechanism of an antifreeze protein from winter flounder," *Nature*, 375:427-431, 1995.

Van Opdenbosch and Evrard, "1-{1-[4,4-Bis(4-fluorophenyl)butyl]-4-piperidinyl}-5-chloro-1,3-dihydro-2H-benzimidazol-2-one: Clopimozide," *Acta Cryst.*, B33:595-599, 1977.

Weeks et al., "The crystal amd molecular structures of two 9α-fluoro-2α-methyl steroids," *Acta Cryst.*, B32:2819, 1976.

* cited by examiner

Silicate chain from Plancheite ( $Cu_8Si_8O_{22}(OH)_4$ )

$R_3SiX$, HY, solvent  →  $CuY_2$

OR $R_3SiH$ or $R_3SiSiR_3$, solvent, catalyst  →  Cu metal

Postulated Structure of Existing Icegrip
Side view, one repeat unit
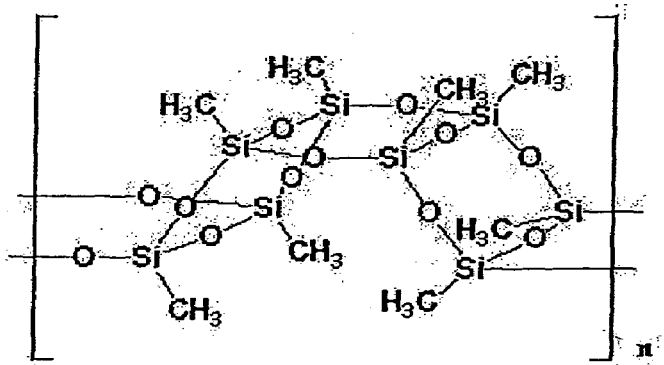
FIG. 13A
abbreviation
Top view, one repeat unit
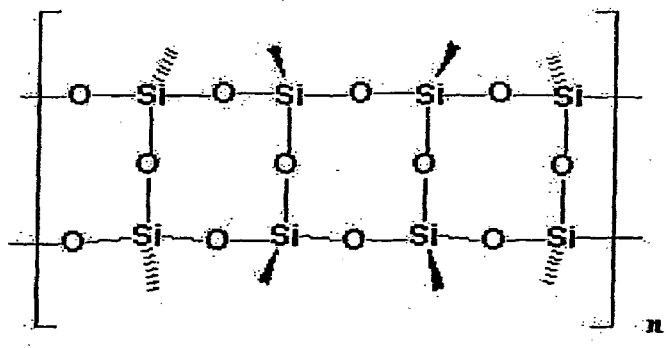
FIG. 13B
n is estimated to be 2,000 to 6,000
Several chains packed together in the crystal
FIG. 13C
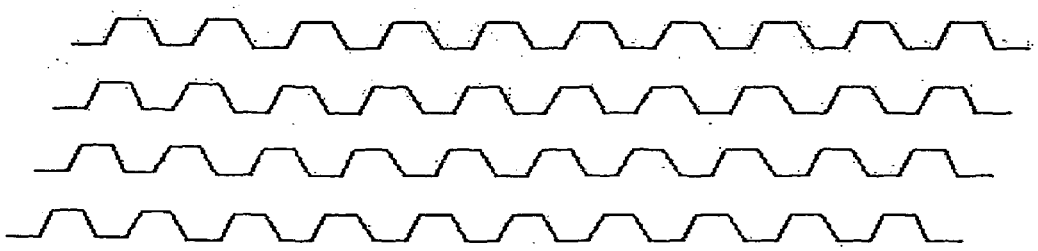

Modified "Crankshaft" Icegrip

R = CH$_3$, ↚\~\~\~NH$_2$, and/or

Modified fiber, shown with 3-aminopropyl groups

Modified "Crankshaft" Icegrip

R = CH₃,  , and/or

Modified crystal, shown with 3-aminopropyl groups attached to all faces

POLYMER COMPOSITION FOR TRACTION ON ICE

This application claims the benefit of U.S. Provisional Application No. 60/489,152, filed Jul. 22, 2003. The entire text of the above provisional application is specifically incorporated by reference.

BACKGROUND OF THE INVENTION

A. Field of the Invention

The present invention relates generally to the fields of polymer chemistry. More particularly, it provides a variety of compositions and methods for use in the formation of polymers having an increased adhesion to ice.

B. Description of Related Art

Each year numerous automobile accidents, as well as pedestrian accidents are caused by ice on the roadways or sidewalks resulting in extensive property damage, human suffering, and sometimes the loss of human life. The development of new ways to increase the adhesion of articles of manufacture such as tires or footwear to ice would likely result in fewer accidents.

There are a variety of methods used to reduce the amount of slipping and sliding of tires and other articles of manufacture on surfaces covered with ice. These methods include attaching studs or spikes on the surface of a car tire to incorporating hard powders such as silica to the surface. This can be damaging to the tire and the surface and can cause reduced traction when the surface is not icy.

There are generally three existing approaches to the problem of traction on ice: 1) materials which will enhance friction on ice, 2) devices designed to increase friction by digging into the ice; or 3) destruction of the ice itself.

1. Materials that Enhance Friction on Ice

Examples of the first approach include modifying the surface of the article. This has been accomplished by spraying a polymer or other coating material onto the surface of a tire or shoe sole. One traction composition comprising a lignin-based phenolic compound, a silicone resin, a rosin, and a suitable carrier that is sprayed onto a tire or shoe to impart anti-slip properties is discussed in U.S. Pat. No. 5,530,040.

Similarly, Insta-Trak, Prestone's wood-rosin-based spray, which was intended to be applied to automobile tires at the point of use, is claimed to increase traction on ice for a time. However, it wears off after driving a moderate distance.

Products such as "Tyre-Grip" (http://www.tiregrip.com) and "Sure-Drive" (http://www.improvementscatalog.com), "Shoe-Grip" and "Sure-Step" (http://www.shoplifestyleonline.com) are also sprayed on the tire or shoe surface from an aerosol can, and wear off after moderate use (e.g., 50 miles for Insta-Trak). These products must be repeatedly sprayed onto the surface for a continuous increased traction on ice or snowy surface.

Bridgestone has developed a tire having a foamed rubber layer (see for example U.S. Pat. No. 6,497,261, U.S. Pat. No. 6,021,831, and U.S. Pat. No. 5,788,786). This is based on the idea that ice, even below freezing, has a thin layer of liquid on its surface. The tire has a spongy surface designed to absorb this, so that the tire would contact the solid surface only.

3M produces a rough material called "SafetyWalk" which is supposed to enhance traction in general—not just on ice. It comes as adhesive-backed sheets, which can be applied to a variety of surfaces to provide traction. U.S. Pat. Nos. 6,258,201 and 6,024,824 describe methods of making polymeric articles having better traction or non-skid characteristics by heating the particles and forcefully impinging them into the polymer so that they are at least partially embedded in the polymer. The particles used may be frictional articles including quartz, aluminum oxide, carbon black, and coal slag.

2. Digging into Ice for Increased Traction

Examples of the second method, including devices designed to increase friction by digging into the ice, are much more common and include tire tread compounds containing silica, mineral silicates, or other materials (U.S. Pat. Nos. 4,427,831, 4,918,142, 5,681,874, 5,967,211, 5,929,156, 5,530,040, 5,967,211, 6,228,908, 6,378,584, 4,427,831, and U.S. Patent Apps. 2002/0037950 A1, and 2002/0026003 A1) tires with sipes (U.S. Pat. Nos. 6,250,354, 6,026,875, 6,003,595, 5,873,399, and 5,833,779), tire chains, studs, shoe cleats, and spreading sand.

Another method to increase friction includes modifying an article with a polymer that has an increased grip on an icy surface. U.S. Pat. No. 6,228,908 describes an elastomer having a diene polymer or copolymer containing carbon-tin bonds and terminal hydroxysilanes and an optional filler silica. This polymer is used to form treads on tires having good wet traction and rolling resistance on ice. Another polymer with improved steering and traction performance on snow and ice is described in U.S. Patent App. 2002/0037950 A1. This composition has paper, a rubber component, and preferably silica and short fiber. U.S. Patent App. 2002/0026003 A1 describes a rubber composition for tire tread having diene rubber, glass fibers, a reinforcing agent, and a silicone rubber powder which has improved performance on snow and icy roads. Similar compositions include a rubber for tire tread having a rubber combined with silica, a silane coupling agent, and a powdered cellulose material and are described in U.S. Pat. No. 6,378,584. A composition for a tire with several elastomers reinforced with carbon black and silica-reinforcing fillers is described in U.S. Pat. No. 5,681,874. The addition of silica reinforcing filler was found to increase traction on icy roads. Each of these compositions require the addition of silica or glass fibers for improving traction on wet or icy roads.

Yet another polymer is described in U.S. Pat. No. 4,427,831 which describes a rubber material comprised of norborene and rubber that has an ice gripping capabilities. U.S. Pat. No. 5,967,211 discloses use of certain additives for rubber, possessing hydroxyl groups (in the case of cellulose fibers) or silanol groups (in the case of ceramic microspheres) on the surface, to enhance traction on ice. The hydroxyl or silanol groups are used because of their reactions with special additives that bind rubber, cellulose and silica together. No mention is made of the spatial arrangement of said hydroxyl or silanol groups. The particles are used simply to provide a rougher surface as the tire wears down (rougher, relative to a tire without the fibers and spheres but otherwise the same composition). Similarly, U.S. Pat. No. 5,929,156 discloses the use of amorphous silica as an additive to rubber. This silica has a random structure and is not designed with particular spacing of hydroxy groups.

Numerous inventions have incorporated amorphous silica or other materials with rubber in order to create a tire that has increase adhesion or friction to ice. However, the prior art does not use silicate polymers and can not use the ordered arrangement of silicate polymer to help grip the ice surface. While there are numerous competitive products, no composition discussed above uses surface adhesion from preorganized groups of atoms to enhance adhesion to ice.

Since cleats, tire chains, etc., do not use atomic adhesion, but simply dig holes, they can effect only a minor improvement towards increasing friction. In addition, these all have their own drawbacks: cleats and the like tear up wooden floors, carpets, electrical cords, fire hoses, etc., and can be worn down by concrete. Studded tires can damage road surfaces and are banned in some states.

3. Destruction of the Ice to Increase Friction

An example of the third approach to the problem of traction on ice is to melt the ice with road salt. Salt, though cheap, is needed in enormous quantities, and is notoriously corrosive, driving up the cost of auto maintenance. The large amounts needed every year can adversely affect trees, soil bacteria, and other members of the ecosystem. Salt substitutes exist, but they all cost considerably more per ton than ordinary salt, and still possess in some degree the adverse effects of ordinary salt.

4. Other Mechanisms for Ice Adhesion

Naturally occurring molecules have been found to inhibit ice growth by adsorbing to ice and inhibit ice crystal growth. These proteins and peptides are produced by several species of fish. Haymet has studied the use of winter flounder "antifreeze" proteins that inhibit ice growth in Antarctic fish. These proteins have four threonine side chains equally spaced 11 residues apart that were mutated to other residues. It was found that when the hydroxyl moiety in the threonine residue was replaced with a hydrophobic methyl group from valine and alanine, the ice growth inhibition was not significantly changed. However, this study was focused on the mechanism of an expensive protein in inhibiting ice and does not provide a composition for increasing the traction on an icy surface.

The concept of designing specific artificial chemical agents whose purpose is to control the physics of ice is described in U.S. Pat. No. 6,303,388. This patent describes a process for preparing ice-controlling molecules that can be used to inhibit the incorporation of additional water molecules into the structure and thereby inhibit ice crystal growth, recrystallization, and sublimation. These compounds are also intended to postpone or prevent ice nucleation. The process includes the steps of (1) selecting a template that nucleates ice, (2) testing a molecule to see if it is capable of binding to the template, (3) testing the molecule to see if it inhibits ice crystal growth, and (4) identifying the molecule as an ice interface dopant. The process of this invention is primarily directed at molecules that prevent growth specifically in the direction of the c-axis. This patent provides a process of preparing molecules that will inhibit ice growth and provides several ball-and-stick diagrams with oxygen atoms each to demonstrate the invention. Exemplary classes of dopants are described by molecular structure 3 which simply gives the lattice structure of ice and depicts how atoms in branched and ring structures match the ice lattice. Particularly, U.S. Pat. No. 6,303,388 describes a heterocyclic structure having six 6-membered rings containing two oxygen and three hydroxy groups bound to the multiple ring structure. Three other structures provided in the patent are heterocyclic structures $C_{18}H_{21}O_3$, $C_{10}H_{16}O_2$, and $C_9H_{13}O_2$.

It would therefore be advantageous to develop a material with ice gripping properties that is either adhesive and stable enough not to require frequent application or strong enough to be formed into an article of manufacture such as, for example, a tire tread or shoe sole.

SUMMARY OF THE INVENTION

The present invention overcomes the deficiencies in the art by using specific polymer compositions that have ice adhesion properties. The polymer compositions can be formed into or coated onto the surface of an article of manufacture such as, for example, a tire tread or shoe sole.

Disclosed are compositions and methods for increasing traction or adhesion on ice. In one aspect, the present invention includes a method for increasing traction or adhesion of an article of manufacture on a surface comprising obtaining a composition comprising at least one polymer and attaching the composition to an article of manufacture, wherein the composition increases traction or adhesion of the article of manufacture on the surface. The surface can be any type of surface, including, but not limited to, asphalt, concrete, metal, plastic, ground, roadways, or walkways. The surface can be, for example, icy, slippery, wet, or dry. The article of manufacture can include, but is not limited to, rubber, cloth, polyurethane, or polyester. The rubber can be a silicone based rubber or a diene based rubber, for example. In even more particular aspects, the article of manufacture can be, but is not limited to, a tire, shoe, boot, glove, cane tip, or crutch tip, or any article of manufacture that includes rubber, cloth, polyurethane, or polyester.

The term "attached," "attaching," or "attach" refers to a chemical bond such as a covalent, ionic, non-covalent, or hydrogen bond. The term "attached," "attaching" or "attach" may also refer to the use of an adhesive (e.g., glue) to attach the present compositions to an article of manufacture.

The term "traction" includes the adhesive friction on a body on some surface, as a wheel on a rail or a tire on a road.

In other embodiments, the polymer is attached to the article of manufacture by covalent bonds. The polymer can be a silicate polymer, a plancheite-derived polymer, a pinacol polymer, an indanol polymer, a phenol polymer, or an m-xylylene polymer.

In particular embodiments, the polymer is a silicate polymer having the following structure:

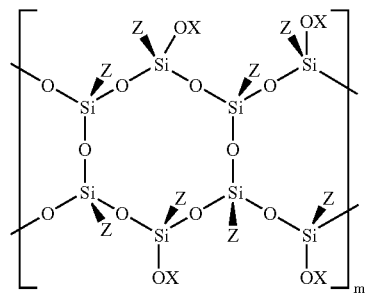

wherein, X can be an $SiR_3$ group, an O—$SiR_3$ group, an H group, a $CH_3$ group, $C_2H_5$ group, an n-alkyl group, a branched alkyl group, an iso-alkyl group, an alkyl group substituted with one or more additional groups, a polymer, a copolymer, a copolymer bonded to a rubber polymer, or a rubber polymer. R can be H, $CH_3$, $C_2H_5$, O—$SiR'_3$, n-alkyl, branched alkyl, iso-alkyl, alkene, alkyne, arene, an alkyl, alkene, alkyne or arene group substituted with further functional groups of its own, or another polymer. Z can be an H group, a $CH_3$ group, a $C_2H_5$ group, a vinyl group, an n-alkyl group, a branched alkyl group, an iso-alkyl group, or an alkyl group substituted with an additional group. M can be an integer from 1 to 40,000. In particular embodiments, the additional group is further defined as an alkyl group, a hydroxyl group, a carboxyl group, an epoxy group, an amine group, an alkene, an alkyne, an arene, a heteroatom or a group of heteroatoms.

In another embodiment of the present invention, the silicate polymer has the following structure:

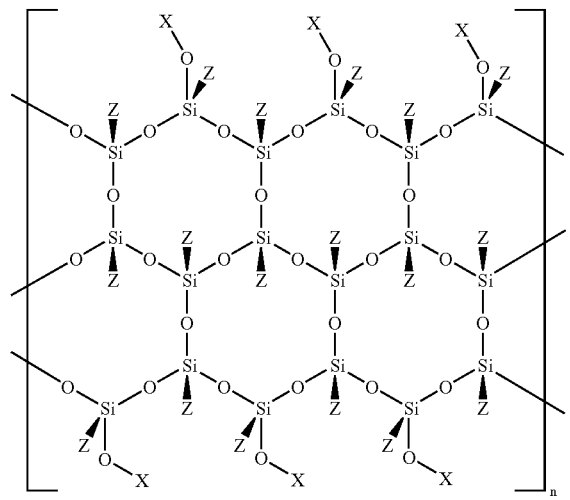

wherein, X can be an SiR$_3$ group, an O—SiR$_3$ group, an H group, a CH$_3$ group, C$_2$H$_5$ group, an alkyl group, a branched alkyl group, an iso-alkyl group, an alkyl group substituted with one or more additional groups, a polymer, a copolymer, a copolymer bonded to a rubber polymer, or a rubber polymer. R can be an H, CH$_3$, C$_2$H$_5$, O—SiR'$_3$, n-alkyl, branched alkyl, iso-alkyl, alkene, alkyne, arene, an alkyl, alkene, alkyne or arene group substituted with further functional groups of its own, or another polymer, R' is a polymer. Z can be an H group, a CH$_3$ group, a C$_2$H$_5$ group, a vinyl group, an n-alkyl group, a branched alkyl group, an iso-alkyl group, or an alkyl group substituted with an additional group. N can be an integer from 1 to 40,000.

In still another embodiment of this invention, the silicate polymer has the following structure:

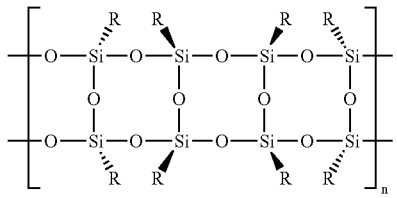

where R can be an H, CH$_3$, (CH$_2$)$_3$—NH$_2$, or (CH$_2$)$_3$—NH—(CH$_2$)$_2$—NH$_2$ a polymer, a copolymer, a copolymer bonded to a rubber polymer, or a rubber polymer; and n is an integer from 1 to 15,000, C$_2$H$_5$, O—SiR'$_3$, alkyl, branched alkyl, iso-alkyl, alkene, alkyne, arene, an alkyl, alkene, alkyne or arene group substituted with one or more additional groups, or another polymer, R' can be a polymer. M can be an integer from 1 to 60,000. In certain aspects, the additional group is further defined as an alkyl group, a hydroxyl group, a carboxyl group, an epoxy group, an amine group, an alkene group, an alkyne group, a heteroatom or a group of heteroatoms.

In another aspect of the present invention, the polymer is a plancheite-derived polymer having the following structure:

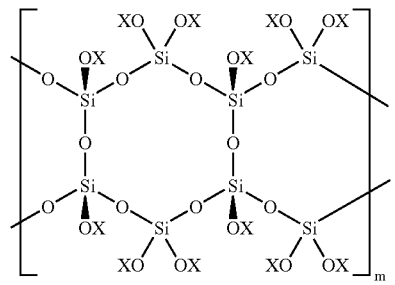

wherein X can be an SiR$_3$ group, an O—SiR$_3$ group, an H group, a CH$_3$ group, C$_2$H$_5$ group, an n-alkyl group, a branched alkyl group, an iso-alkyl group, an alkyl group substituted with one or more additional groups, a polymer, a copolymer, a copolymer bonded to a rubber polymer, or a rubber polymer. R can be an H, CH$_3$, C$_2$H$_5$, O—SiR'$_3$, alkyl, branched alky, iso-alkyl, alkene, alkyne, arene, an alkyl, alkene, alkyne or arene group substituted with further functional groups of its own, or another polymer, R' is a polymer; and m is an integer from 1 to 60,000. In certain aspects, the additional group is further defined as an alkyl group, a hydroxyl group, a carboxyl group, an epoxy group, an amine group, an alkene group, an alkyne group, or a heteroatom.

In still another aspect of this invention, the polymer can be a pinacol polymer having the following structure:

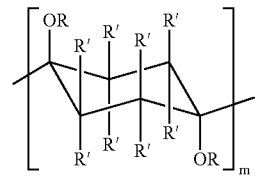

wherein R can be an H group, a CH$_3$ group, C$_2$H$_5$ group, an n-alkyl group, a branched alkyl group, an iso-alkyl group, an acyl group or an alkyl group substituted with one or more additional groups, a polymer, a copolymer, a copolymer bonded to a rubber polymer, or a rubber polymer; each R' is independently an H group, a CH$_3$ group, Cl, F, Br, C$_2$H$_5$ group, or an alkyl, alkene, or alkyne group; and m is an integer from 1 to 21. The additional group can be further defined as an alkyl group, a hydroxyl group, a carboxyl group, an epoxy group, an amine group, an alkene group, an alkyne group, or a heteroatom. In particular aspect, m is an integer from 2 to 6.

In another embodiment of the present invention, the pinacol polymer has the following structure:

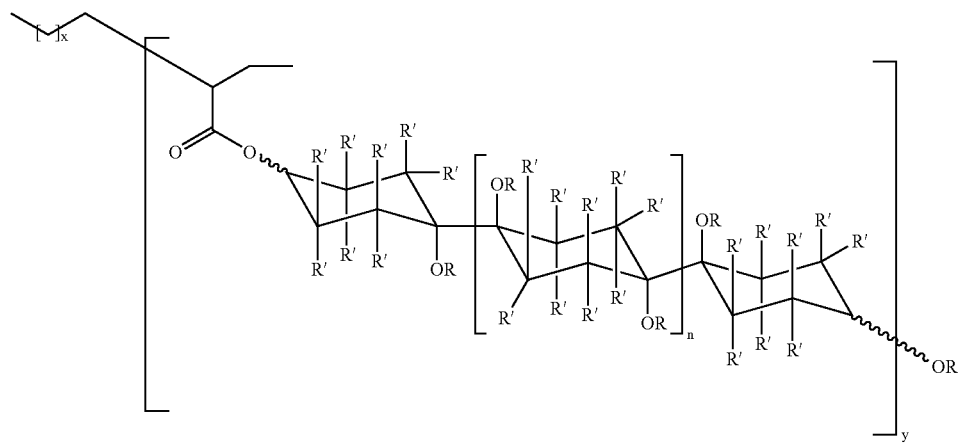

wherein R can be an H group, a $CH_3$ group, $C_2H_5$ group, an n-alkyl group, a branched alkyl group, an iso-alkyl group, an alkyl group substituted with an additional group or a polymer, a copolymer, a copolymer bonded to a rubber polymer, or a rubber polymer; each R' is independently an H group, a $CH_3$ group, Cl, F, Br, $C_2H_5$ group, an alkyl, alkene, alkyne group, an alkyl group substituted with an additional group, a polymer, a copolymer, a copolymer bonded to a rubber polymer, or a rubber polymer; n can be an integer from 1 to 18; x is an integer from 1 to 200,000; and y is an integer from 1 to 200,000. The additional group can be further defined as an alkyl group, a hydroxyl group, a carboxyl group, an epoxy group, an amine group, an alkene group, an alkyne group, or a heteroatom. In certain aspects, n is an integer from 1 to 6.

In still another embodiment of the present invention, the polymer can be an indanol polymer having the following structure:

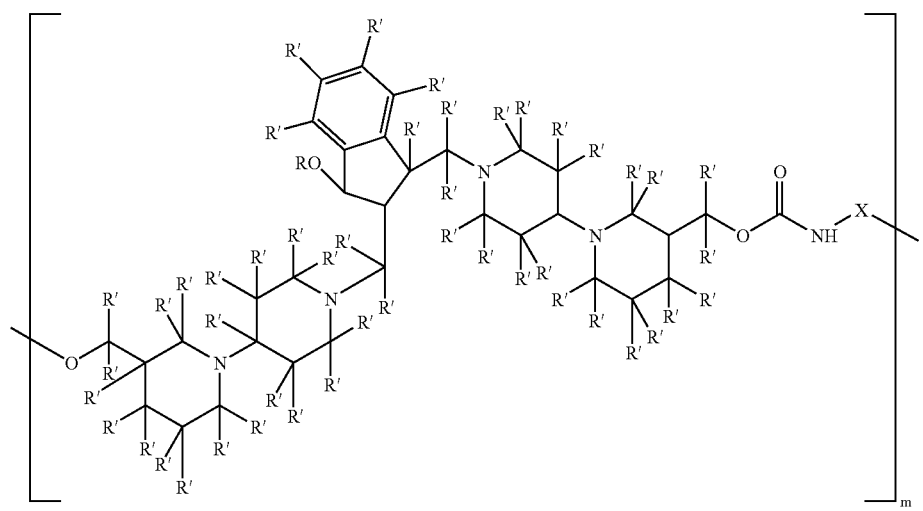

wherein X is an alkyl, substituted alkyl, branched alkyl, n-alkyl, iso-alkyl, $(CH_2)_n$, $CH_3(CH_2)_n$, carboxyl, epoxy, amine, an alkene group, an alkyne group, or heteroatoms; R is a H, $CH_3$, $C_2H_5$, branched alkyl, n-alkyl, iso-alkyl, or alkyl groups substituted with further functional groups of their own, such as hydroxyl, carboxyl, epoxy, amine, alkene, alkyne or heteroatoms, a polymer, a copolymer, a copolymer bonded to a rubber polymer or a rubber polymer; and m is an integer from 1 to 40,000. In particular aspect of this invention, the indanol polymer can be attached to other polymer(s) (e.g., the polymers disclosed throughout this specification) via: (1) OH groups; (2) the use of a tri- or polyisocyanate mixed in with the diisocyanate used for polymerization; (3) mixing a polyol, or polyamine, or polyamine-polyol, with the indanol polymer, so that more OH or $NH_2$ groups remain available after polymerization; and (4) an attack of an isocyanate group on a urethane group in the indanol polymer. It is also important to note that any polymer containing OH-reactive groups will be suitable for use as a crosslinker to the indanol polymer. These groups include, but are not limited to, epoxide, isocyanate, maleimide, maleate ester, acyl halide, silyl halide.

In still another aspect of this invention, the polymer can be a phenol polymer having the following structure:

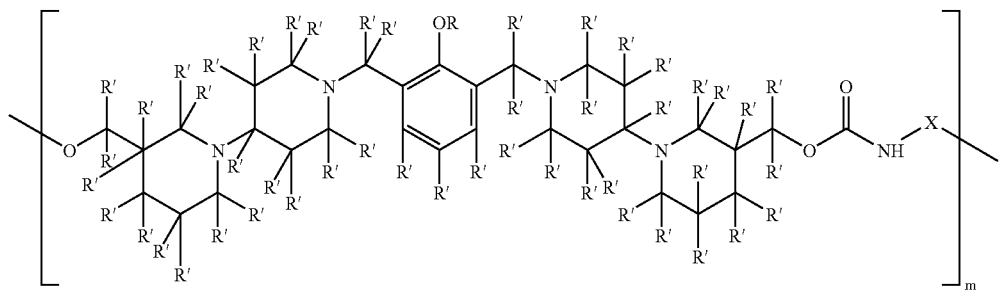

wherein X can be an alkyl, substituted alkyl, branched alkyl, n-alkyl, iso-alkyl, $(CH_2)_n$, $CH_3(CH_2)_n$, carboxyl, epoxy, amine, alkene, alkyne, or heteroatoms; R is a H, alkyl, substituted alkyl $CH_3(CH_2)_n$, a polymer, a copolymer, a copolymer bonded to a rubber polymer or a rubber polymer; $R_1$ can be an H, $CH_3$, alkyl, heteroalkyl, a substituted heteroalkyl, a copolymer, a copolymer bonded to a rubber polymer or a rubber polymer; and m can be an integer from 1 to 40,000. In particular aspect of this invention, the phenol polymer can be attached to other polymer(s) (e.g., the polymers disclosed throughout this specification) via: (1) OH groups; (2) the use of a tri- or polyisocyanate mixed in with the diisocyanate used for polymerization; (3) mixing a polyol, or polyamine, or polyamine-polyol, with the phenol polymer, so that more OH or $NH_2$ groups remain available after polymerization; and (4) an attack of an isocyanate group on a urethane group in the phenol polymer. It is also important to note that any polymer containing OH-reactive groups will be suitable for use as a crosslinker to the phenol polymer. These groups include, but are not limited to, epoxide, isocyanate, maleimide, maleate ester, acyl halide, silyl halide.

In yet another aspect of this invention, the polymer can be an m-xylylene polymer having the following structure:

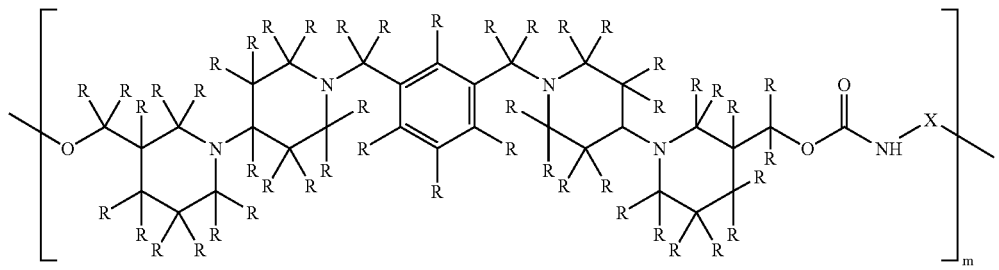

wherein X can be an alkyl, substituted alkyl, branched alkyl, n-alkyl, iso-alkyl, $(CH_2)_n$, $CH_3(CH_2)_n$, carboxyl, epoxy, amine, alkene, alkyne, heteroatoms, a polymer, a copolymer, a copolymer bonded to a rubber polymer or a rubber polymer; each R can be an H, $CH_3$, alkyl, heteroalkyl, a substituted heteroalkyl, a polymer, a copolymer, a copolymer bonded to a rubber polymer or a rubber polymer; and; m is an integer from 1 to 40,000.

In particular aspect of this invention, the m-xylylene polymer can be attached to other polymer(s) (e.g., the polymers disclosed throughout this specification) via: (1) OH groups; (2) the use of a tri- or polyisocyanate mixed in with the diisocyanate used for polymerization; (3) mixing a polyol, or polyamine, or polyamine-polyol, with the m-xylylene polymer, so that more OH or $NH_2$ groups remain available after polymerization; and (4) an attack of an isocyanate group on a urethane group in the m-xylylene polymer. It is also important to note that any polymer containing OH-reactive groups will be suitable for use as a crosslinker to the m-xylylene polymer. These groups include, but are not limited to, epoxide, isocyanate, maleimide, maleate ester, acyl halide, silyl halide.

The article of manufacture can comprise rubber, cloth, polyurethane or polyester. The rubber can be a silicone based rubber or a diene based rubber. In even more particular non-limiting aspects, the article of manufacture is further defined as a tire, shoe, boot, glove, cane tip, crutch tip, snowmobile treads, snowshoes, ice tongs, ski poles, tank treads, or shoe coverings that fit over a shoe.

Also contemplated is an article of manufacture comprising a composition comprising a polymer selected from the group consisting of a silicate polymer, a plancheite-derived polymer, a pinacol polymers, an indanol polymer, a phenol polymer, and an m-xylylene polymer. In particular aspects of the present invention, the article of manufacture comprises rubber, cloth, polyurethane or polyester. The rubber can be a silicone based rubber or a diene based rubber. In even more particular non-limiting aspects, the article of manufacture is further defined as a tire, shoe, boot, glove, cane tip, crutch tip, snowmobile treads, snowshoes, ice tongs, ski poles, tank treads and shoe coverings that fit over a shoe.

The inventors also contemplate a composition that provides for increased traction or adhesion on ice comprising a polymer attached to a material, wherein the polymer is selected from the group consisting of a silicate polymer, a plancheite-derived polymer, a pinacol polymer, an indanol polymer, a phenol polymer, and an m-xylylene polymers. The structure of these polymers can be any polymer structure disclosed in this specification.

The use of the word "a" or "an" when used in conjunction with the term "comprising" in the claims and/or the specification may mean "one," but it is also consistent with the meaning of "one or more," "at least one," and "one or more than one." Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

It is contemplated that any embodiment discussed in this specification can be implemented with respect to any method or composition of the invention, and vice versa. Furthermore, compositions of the invention can be used to achieve methods of the invention.

the term "about" is used to indicate that a value includes the inherent variation of error for the device, the method being employed to determine the value, or the variation that exists among the study subjects.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 13A, FIG. 13B, FIG. 13C, FIG. 13D and FIG. 13E Postulated structure of a silicate polymer. FIG. 13A is a side view of one repeat unit of the polymer. FIG. 13B is a top view of one repeat unit of the polymer. FIG. 13C is a depiction of several polymer chains patched together into a crystal like structure. FIG. 13D represents a silicate polymer fiber. The amorphous areas act as crosslinks with other chains. It is estimated that about 2,000 to 6,000 repeat units are contained in one fiber. FIG. 13E represents a silicate polymer crystal. The amorphous areas act as crosslinks with other chains. It is estimated that about 2,000 to 8,000 repeat units are contained in one crystal.

FIG. 14A represents a modified structure of a silicate polymer. FIG. 14B represents a modified fiber having 3-aminopropyl groups. FIG. 14C is a modified crystal having 3-aminopropyl groups attached to all faces.

DESCRIPTION OF ILLUSTRATIVE EMBODIMENTS

Because ice is slippery, it can and does cause many automobile and pedestrian related accidents. By increasing the traction of an article of manufacture (e.g. a tire or a shoe sole) on ice, many of these accidents can be avoided.

The methods and compositions disclosed in the present invention can be used, for example, for increasing the traction or adhesion of an article of manufacture on a surface (e.g. an icy surface). The disclosed methods and compositions can increase friction with ice by promoting adhesion of surface atoms. The compositions can be designed to match the structure of ice, holding oxygen and/or nitrogen atoms at a particular position to connect to the ice. This allows for increased traction or adhesion on the ice without any pretreatment or alteration of the ice surface or the article of manufacture.

Because of its mechanism of action, the compositions of the current invention are effective with one of the most treacherous types of ice: the so-called "black ice" which can be formed by a freezing puddle, or by freezing rain. Black ice is transparent, thus making it difficult to see, particularly at night or while driving.

A. Ice

The term "ice" refers to frozen water. Ice may be substantially pure or may contain significant impurities such as salt, sand, gravel, oil, or other substances commonly found on roads, sidewalks, and other surfaces after a snow or ice storm. Ice crystals have a defined structure with measurable distances between various atoms within the structure. Of importance for the current invention, the hydrogen molecules on the surface of the ice crystal are capable of forming hydrogen bonds and are spaced about 4.51 Angstrom apart. This distance varies very little over a large temperature range, with a change of only 0.04-Angstrom from −196° C. to 0° C. (Franks 1972).

Figure 7:
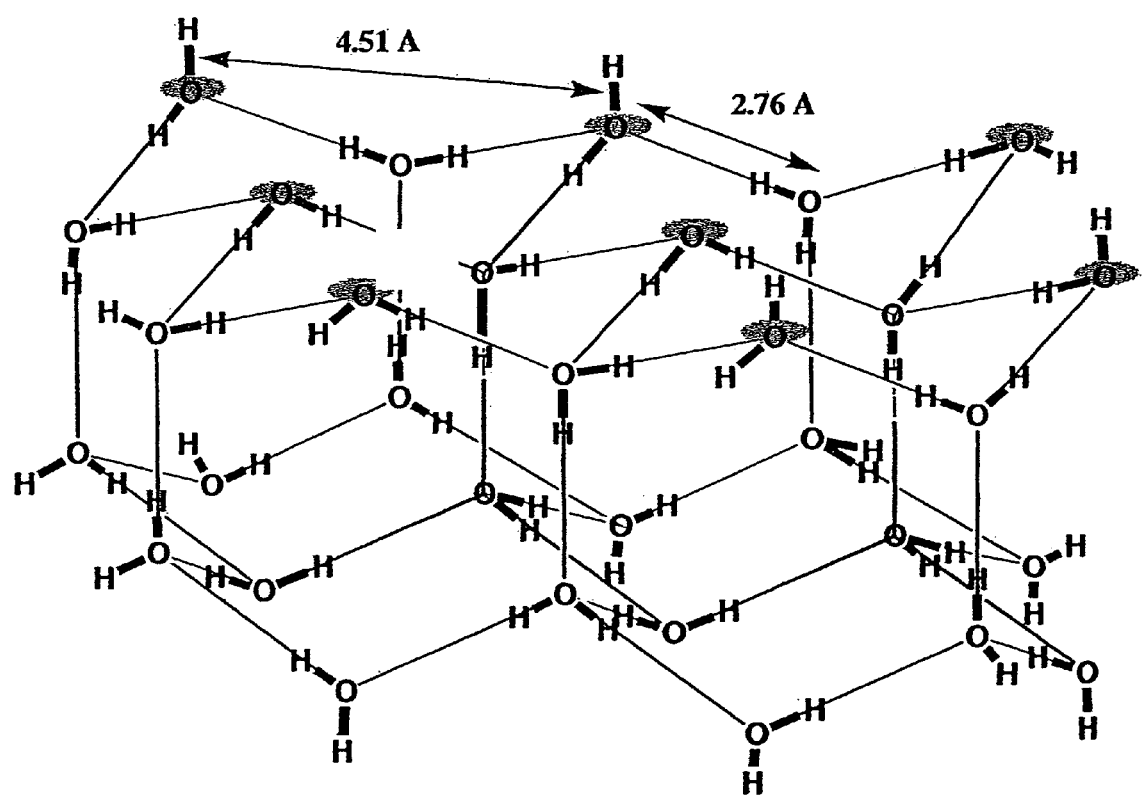
FIG. 7 Ice lattice. The shaded circles represent the position of surface water molecules on the ice. The hydrogen atoms are not fixed in space. They can move rapidly from one water molecule to another, and can point upward as needed.

The crystal structure of ice, including distances between oxygen atoms is shown in FIG. 7. This structure has been well studied and can be found in "Crystal Structures," (1963) and in "Dana's New Mineralogy" (1997). The surface of ice contains a layer of liquid water; this layer has been examined both theoretically (Karim, 1988) and experimentally (Beaglehole, 1988). The layer of water is believed to be only one to five molecules thick.

Snow and ice-covered roads are the most slippery when the ambient temperature is around 0° C. At warmer temperatures, the surface is softer and provides more traction. At lower temperatures, snow retains a core consistent composition. At temperatures near 0° C., heat generated by tires and other contact can melt snow, which then refreezes to form ice. On ice, the friction heat can melt the ice slightly, creating a film of water between the tire and icy surface.

The modern theory of friction attributes friction to adhesion between surface atoms. These surface atoms form bonds, similar in strength to those that hold the solids themselves together, and friction represents the force required to break these bonds. Atomic forces are known to be of very short range (about $10^{-10}$ m), and accordingly the bonds are appreciable only at those small patches (called junctions) at which the surface atoms come within 10 Angstrom of each other. All the friction due to adhesion originates at these junctions, which make up the real area of contact. Over the rest of the apparent area of contact the separation of the surfaces is generally many hundreds or thousands of atomic diameters, and essentially none of the friction originates there. In a typical sliding system involving relatively large surfaces, the real area of contact is less than 1% of the apparent area.

The adhesion mechanism accounts for more than 90% of the total friction force, with approximately 10% coming from the plowing mechanism, roughness effect, elastic hysteresis, or electrostatic attraction between surfaces.

B. Polymers

1. Silicate Polymers

Silicate polymers are polymers containing the $SiO_4^{-4}$ tetrahedral group. The classification of these silicate polymers is based on the polymerization of the silicate tetrahedron.

A silicate polymer is advantageous since it carries the preorganization concept to much higher levels than with most polymer substance. The organic polymers have preorganized sections with about 7 properly placed atoms per section available for bonding with an ice lattice. In the inorganic silicate polymers, which are advantageous in that they can be produced in fewer steps and therefore at a lower cost. Any part of the inorganic silicate polymer contacting ice would place thousands of properly arranged atoms on the ice simultaneously, resulting in a much better grip.

A sheet (or ribbon) of hexagonal $Si_6O_6$ rings holds the oxygen atoms at almost exactly the same distance apart as they are on the surface of an ice crystal. The $Si_6O_6$ rings (Dana's New Minerology, $8^{th}$ Ed. Pages 1405, 1444–1451, 1997) in similar mineral structures, vermiculite and its relatives, the micas, hold water in ice-like layers in between the silicate layers, even at temperatures well above freezing. This phenomenon is of considerable importance as it contributes to the water-holding capacity of soils. Klein (1985) has demonstrated this phenomenon with vermiculite, a sheet silicate containing sheets of hexagonal $Si_6O_6$ rings.

These materials display in their structures a repeating unit of 5.2–5.3 Angstroms (the rings may not be regular hexagons so they may be longer or shorter in one direction). This distance is the width of one hexagon. Muscovite mica, the most common type, has $Si_6O_6$ rings 5.2 Angstroms wide ("Dana's New Minerology," 1997) and has been shown to bind strongly to ice. Although mica will bind strongly to ice, the multiple layers of mica are very weakly bound together and will fracture and separate easily, effectively losing any grip.

As a test of the binding ability of silicate polymers to the surface of ice, mica was allowed to freeze onto an ice surface. Ice adheres strongly to mica at room temperature. This adhesion is strong enough to support the weight of an ice cube hanging upside down from a mica surface.

The silicate polymers of the current invention are accessible through silylation of known chain mineral silicates. This would ensure the stereochemistry as shown herein.

2. $Si_6O_6$ Ring Silicate Polymer

Figure 8:
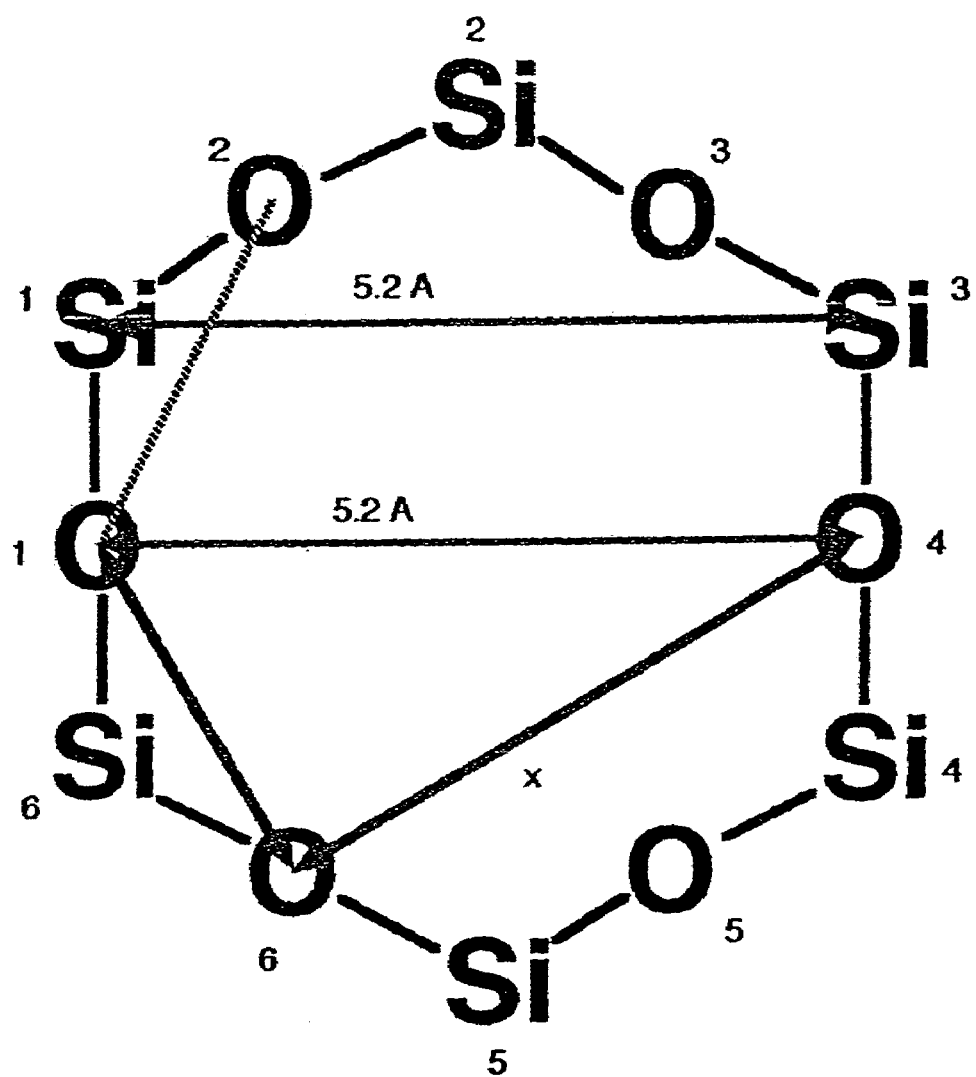
FIG. 8 $Si_6O_6$ ring dimensions. The width of one undistorted hexagonal $Si_6O_6$ ring is about 5.2 Angstroms (distance between Si1 and Si3). The angle O6-O1-O2 is 120 degrees. The angle O6-O1-O4 is 60 degrees. The distance of O4 to O6 as represented by x is 4.5 Angstroms.

Silicate polymers of the current invention possess hexagonal $Si_6O_6$ rings (FIG. 8). FIG. 8 demonstrates that an undistorted $Si_6O_6$ ring 5.2 Angstroms wide will have oxygen atoms held at 4.5 Angstroms apart, very near the critical distance within the ice lattice. By analogy with known structures, these polymers should also have oxygen atoms held about 4.5 Angstroms apart, allowing for maximum binding to ice. Slight flexure of the chains or slight bending of the hydrogen-bonded surface molecules, allowing thousands of atoms to bind at once can compensate for any small discrepancy between the ice lattice and the chain size.

The artificial silicate polymer of the present invention having joined $Si_6O_6$ rings and spacing between oxygen atoms similar to the hydroxyl spacing on an ice crystal can be described by:

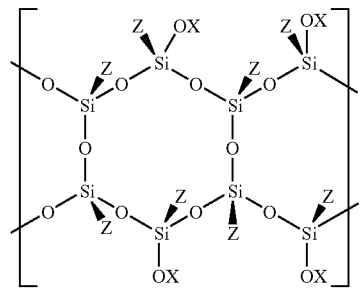

where X can be an $SiR_3$ group, an $O-SiR_3$ group, an H group, a $CH_3$ group, $C_2H_5$ group, an n-alkyl group, a branched alkyl group, an iso-alkyl group, an alkyl group substituted with an additional group, a copolymer, a copolymer bonded to a rubber polymer, or a rubber polymer, R is H, $CH_3$, $C_2H_5$, O—$SiR'_3$, n-alkyl, branched alkyl, iso-alkyl, alkene, alkyne, arene, an alkyl, alkene, alkyne or arene group substituted with further functional groups of its own, or another polymer, R' can be a polymer, and Z can be an H group, a $CH_3$ group, a $C_2H_5$ group, a vinyl group, an n-alkyl group, a branched alkyl group, an iso-alkyl group, or an alkyl group substituted with an additional group. In certain aspects, the additional group is further defined as an alkyl group, a hydroxyl group, a carboxyl group, an epoxy group, an amine group, an alkene group, an alkyne group, or a heteroatom.

Figure 1:
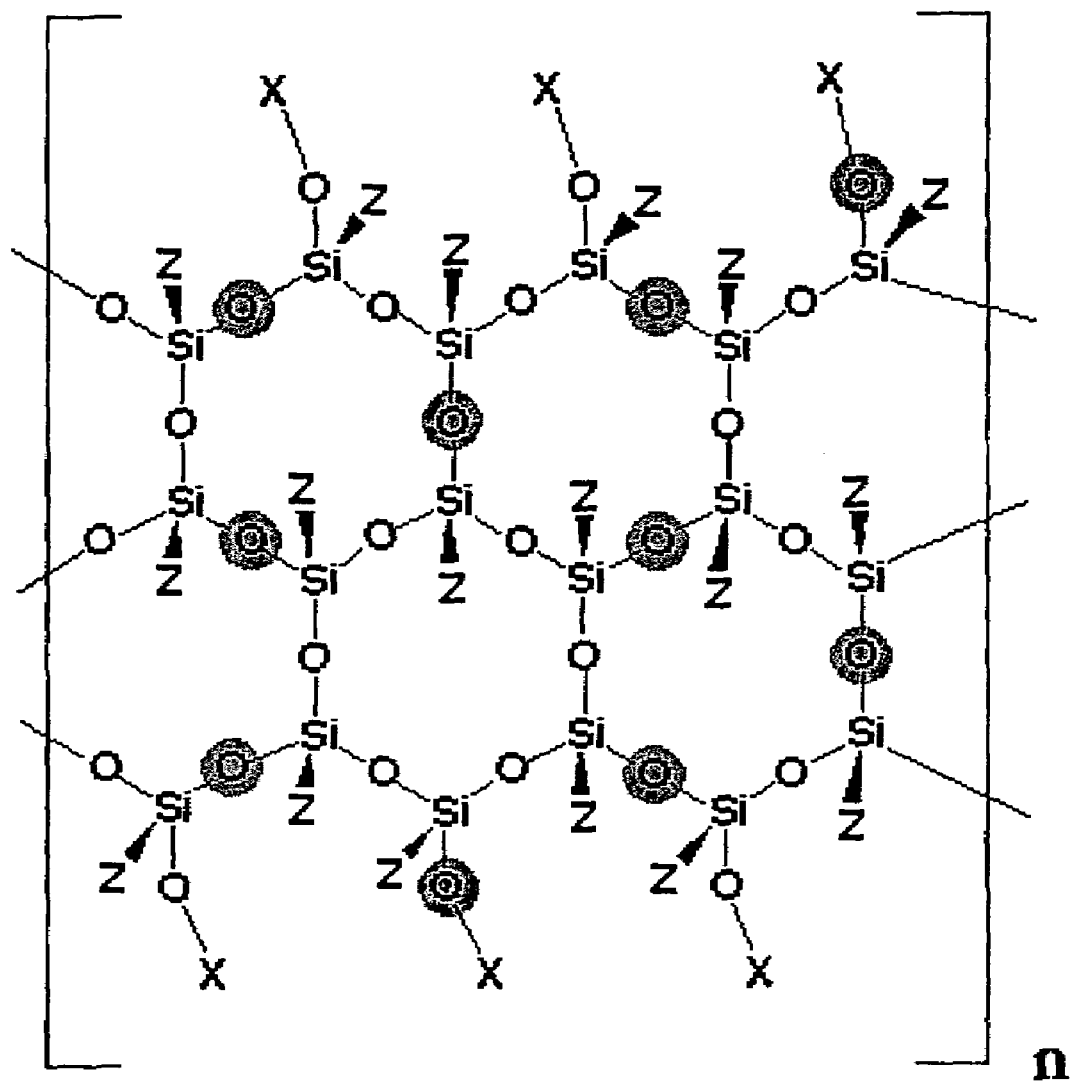
FIG. 1 Binding of a silicate polymer to an ice lattice. The Shaded circles represent the position of surface water molecules on the ice.

FIG. 1 depicts this polymer as well as the spacing of hydroxyl groups on an ice lattice. Shaded circles represent water molecules on the surface of the ice crystal (a triangular lattice of points 4.52 Angstroms, or $4.52 \times 10^{-10}$ meters, apart). It is readily apparent that even the short segments shown bind to a large number of water molecules.

The polymer derived from the aforementioned artificial silicate would have another advantage: since the silicon atoms are each attached to one carbon atom (when Z is not H) and three oxygen atoms instead of four oxygen atoms, as in a normal silicate, the resulting $CSiO_3$ units are polar, with the negative end of the dipole towards the oxygen atoms. The oxygen atoms are on the side of the chain facing the ice; thus the dipole will attract the positively charged hydrogen atoms in the ice. This will further enhance binding and adhesion of the silicate polymer. This property, and its ability to place thousands of preorganized oxygen atoms on the ice surface, makes this polymer a preferred structure for increased gripping on ice.

3. $Si_4O_4$ Ring Silicate Polymer

Another silicate polymer contemplated in the present invention is a single chain polymer of the formula:

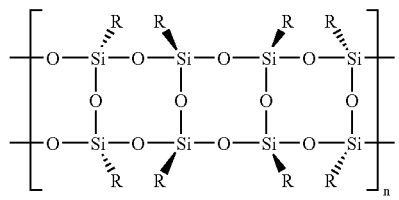

where R can be an H, $CH_3$, $(CH_2)_3$—$NH_2$, or $(CH_2)_3$—NH—$(CH_2)_2$—$NH_2$ and n can be an integer from 1 to 15,000 or more preferably between 2000 and 6000. In one embodiment, all R groups are methyl groups. In another, some of the R groups are substituted with an 3-aminopropyl group.

The polymer where R is CH3 is formed by hydrolyzing methytrimethoxysilane and is highly crystalline. The structure is believed to be a ladder-type structure with multiple long polymer chains stacked together in rows. This polymer is insoluble in water and the common organic solvents. Amorphous sections may be found in the polymer and comprise areas of high crosslinking.

4. Plancheite-Derived Polymers

The crystal structures of some chain silicates such as plancheite also display a repeating unit in the range of 5.2–5.3 Angstroms. For plancheite, this distance is 5.27 Angstroms since the $Si_6O_6$ rings are not regular hexagons but are stretched and slightly skewed. (Evans et al., 1977).

Plancheite is a copper silicate mineral with the molecular composition $Cu_8Si_8O_{22}(OH)_4 \cdot (H_2O)$. The three dimensional structure of plancheite is described elsewhere (Evans, et al. 1977). The plancheite-derived polymers of the current invention is described by:

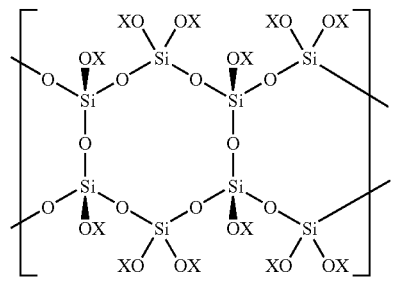

where X can be an $SiR_3$ group, an O—$SiR_3$ group, an H group, a $CH_3$ group, $C_2H_5$ group, an n-alkyl group, a branched alkyl group, an iso-alkyl group, an alkyl group substituted with an additional group, a copolymer, a copolymer bonded to a rubber polymer, or a rubber polymer, R can be an H, $CH_3$, $C_2H_5$, O—$SiR'_3$, n-alkyl, branched alkyl, iso-alkyl, alkene, alkyne, arene, an alkyl, alkene, alkyne or arene group substituted with further functional groups of its own, or another polymer, and R' is a polymer.

Figure 2:
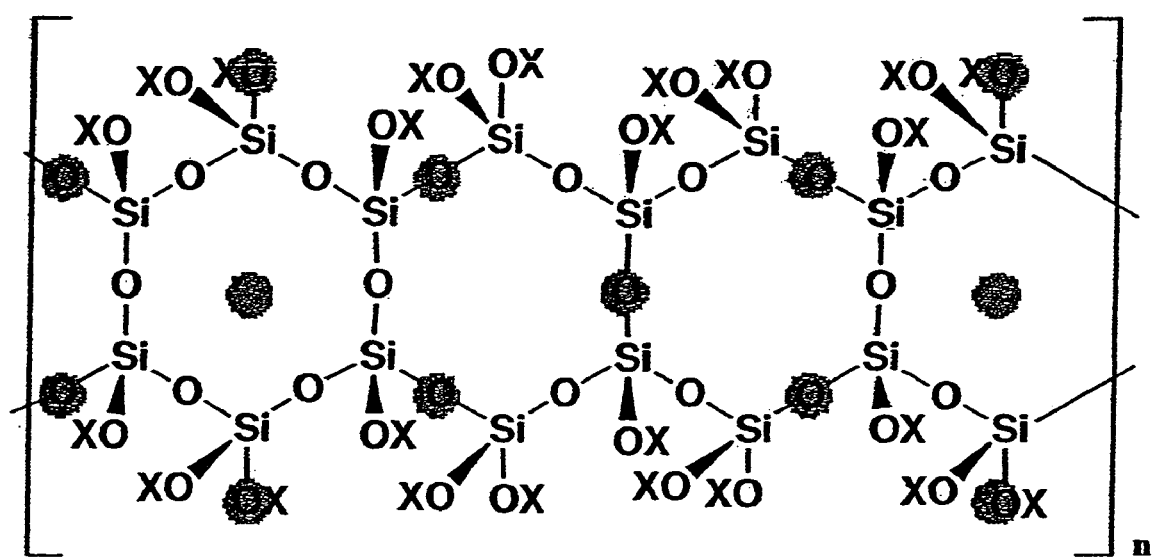
FIG. 2 Binding of plancheite-derived polymer to an ice lattice. The Shaded circles represent the position of surface water molecules on the ice.

The spacing of hydroxy groups of the plancheite-derived polymer on an ice lattice is shown in FIG. 2.

5. Other Silicate Polymers

There are a variety of naturally occurring silicates, many of which can be used as a seed for the artificial silicates of the current invention. The limitation on use of these silicates is that the spacing of hydroxy groups must be similar to the spacing of oxygen on the ice lattice (e.g., 4.51 Angstroms).

Silicate polymers that may be used in the current invention are based on a variety of structures of silicates. Orthosilicates or nesosilicates such as garnet and olivine have isolated tetrahedral silicate $SiO_4^{-4}$ groups. Disilicates or sorosilicates such as epidote have two corner-linked $SiO_4^{-4}$ tetrahedra. Cyclosilicates or ring silicates such as beryl and tourmalines form when $SiO_4^{-4}$ groups link to form 3, 4 or 6-membered rings. Inosilicates are single and double-chained silicates. Single chain silicates such as pyroxenes have an infinite chain of silicate tetrahedra and have a bulk composition of $Si_2O_6^{-4}$. Double chain silicates have two chains of silicate tetrahedra and have a bulk composition of $Si_4O_{11}^{-6}$ or more commonly $Si_8O_{22}^{-12}$. The $Si_6O_6$ polymer and the plancheite-derived polymers described hereinabove fall into this category of silicate polymers. Other silicate polymers include sheet silicates or phyllosilicates such as mica, which contain sheets of silicate $SiO_4^{-4}$ tetrahedra. Three of the oxygen atoms of the tetrahedron adjoin neighboring tetrahedra to form an infinitely extending flat sheet. Framework silicates or tectosilicates consist of a framework of silicate tetrahedra where each of the four oxygen atoms of the $SiO_4^{-4}$ tetrahedron is shared with adjoining tetrahedra. Quartz is a framework silicate with an overall composition of $SiO_2$ and a net charge of zero.

Silicate polymers in which the $SiO_4^{-4}$ tetrahedrons form double chains are particularly preferred in the current invention. They can be used particularly as seeds to form artificial silicate polymers. Amphiboles are a group of naturally occurring double chain silicates having a prismatic cleavage at an angle of about 124°. Subgroups of the amphiboles include cummingtonite (Fe—Mg—Li Clinoamphiboles), the anthophyllite subgroup (Fe—Mg—Li Orthoamphiboles), the tremolite subgroup (Ca Amphiboles), the richterite subgroup (Ca—Na Clinoamphiboles), and the glaucophane subgroup (Alkali Amphiboles). (http://mineral.galleries.com/minerals/silicate/amphibol.htm). Other naturally occurring double chain silicates include Astrophyllite (Potassium Iron Titanium Silicate Hydroxide), Babingtonite (Calcium Iron Manganese Silicate Hydroxide), Charoite (Hydrated Sodium Calcium Barium Strontium Silicate Hydroxide Fluoride), Epididymite (Sodium Beryllium Silicate Hydroxide), Euddidymite (Sodium Beryllium Silicate Hydroxide), Inesite (Hydrated Calcium Manganese Silicate Hydroxide), Kupletskite (Potassium Sodium Manganese Iron Titanium Niobium Silicate Hydroxide), Plancheite (Hydrated Copper Silicate Hydroxide), Deerite (American Mineralogist, 1977), Howieite (Dear et al. 1997; American Mineralogist, 1977) and Yuksporite (Hydrated Potassium Barium Sodium Calcium Titanium Silicate Fluoride Hydroxide).

The silicate polymers of the current invention may preferentially have three O bound to each Si with the remaining group a $CH_3$.

6. Pinacol Polymers

Figure 3:
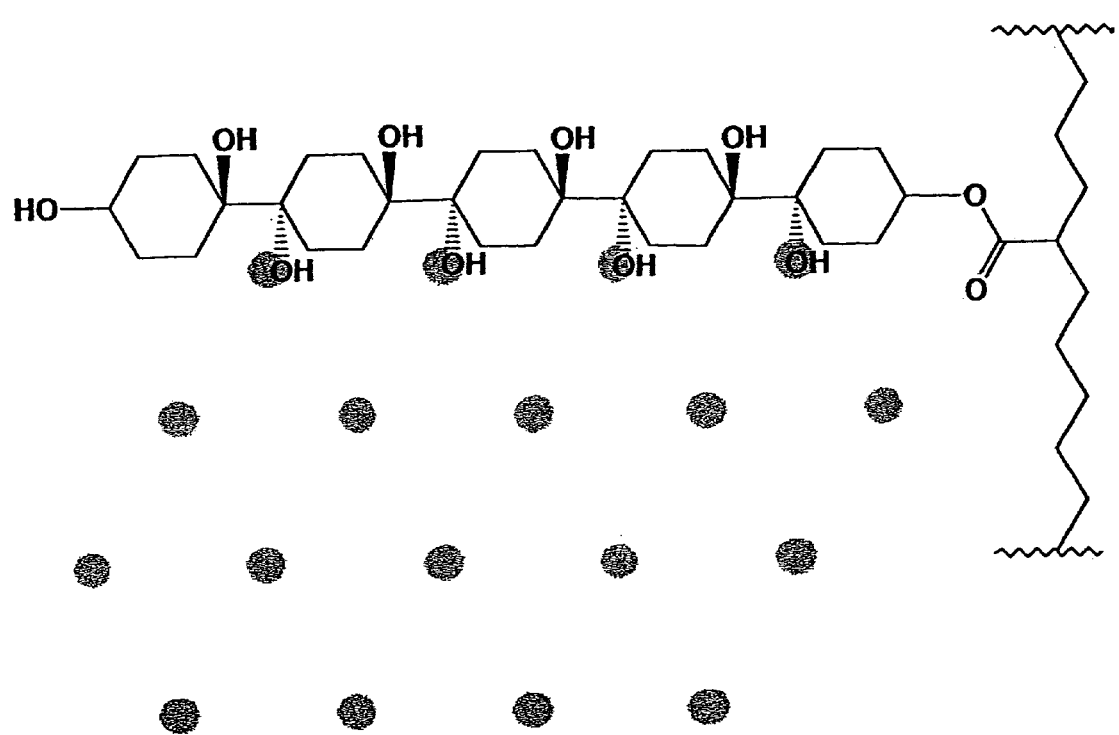
FIG. 3 Binding of a pinacol polymer to an ice lattice. The Shaded circles represent the position of surface water molecules on the ice. The pinacol polymer can bond to surface water molecules or replace the surface water molecules with OH or OR groups.

The pinacol type polymer is shown in FIG. 3. Unlike the silicates, the distance between the gripping atoms in the pinacol polymer is significantly different from the 4.5 Angstroms distance in ice. Thus, gripping molecules of this type cannot be made arbitrarily large, because the size discrepancy would cause part of the pinacol polymer to be misaligned with the ice and not grip. The pinacol O—O distance has been estimated to be 5.02 Angstroms as approximated from 9α-fluoro-11β,17α,21-trihydroxy-2α-methyl-4-pregnen-3,20-dione (Weeks et al., 1976).

In particular embodiments, the pinacol polymer has the following structure:

The gripping molecule, including the hydroxlated cyclohexane rings, is attached to a commercially available copolymer of ethylene and acrylic acid. Other polymers or copolymers may be used in place of the ethylene and acrylic acid shown herein.

R can be an H group, a $CH_3$ group, $C_2H_5$ group, an n-alkyl group, a branched alkyl group, an iso-alkyl group, an alkyl group substituted with an additional group, a polymer, a copolymer, a copolymer bonded to a rubber polymer, or a rubber polymer. Each R' can independently be an H group, a $CH_3$ group, Cl, F, Br, $C_2H_5$ group, or an alkyl, alkene, alkyne group or an alkyl group substituted with an additional group; n can vary between 1 to 18; x can vary between 1 to 200,000; and y can vary between 1 to 200,000.

Similarly, the polymer may be formed with various ligands on the cyclohexyl rings and the hydroxy groups replaced with an OR moiety,

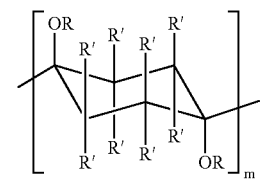

wherein R can be an H group, a $CH_3$ group, $C_2H_5$ group, an n-alkyl group, a branched alkyl group, an iso-alkyl group, or an alkyl group substituted with an additional group, a copolymer, a copolymer bonded to a rubber polymer, or a rubber polymer and each R' can be independently an H group, a $CH_3$ group, Cl, F, Br, $C_2H_5$ group, or an n-alkyl, alkene, or alkyne group. M can vary from between 1 and 21.

Polymers similar to the pinacol polymer described may also be used as ice gripping polymers of the present invention. This polymer could enter the ice surface by replacing surface water molecules with hydroxyl groups from the polymer. This gives the polymer a better grip than would otherwise be had by the polymer.

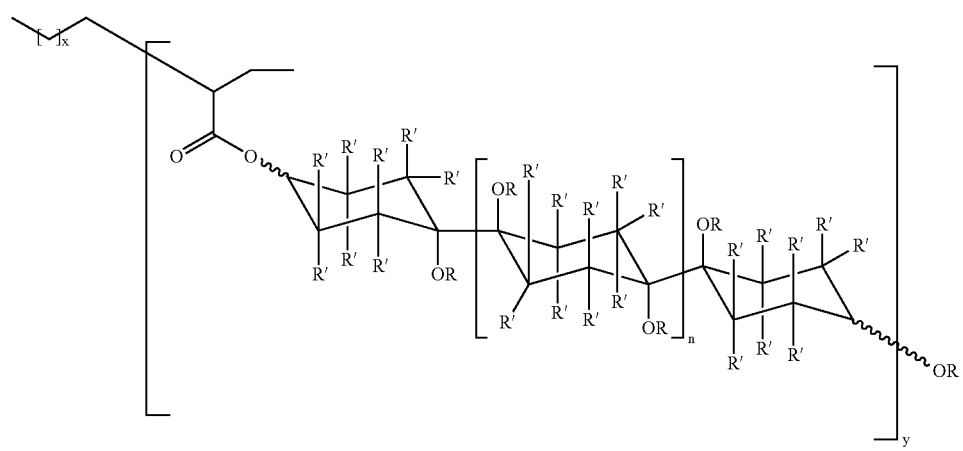

7. Polyamine Polymers

Figure 4:
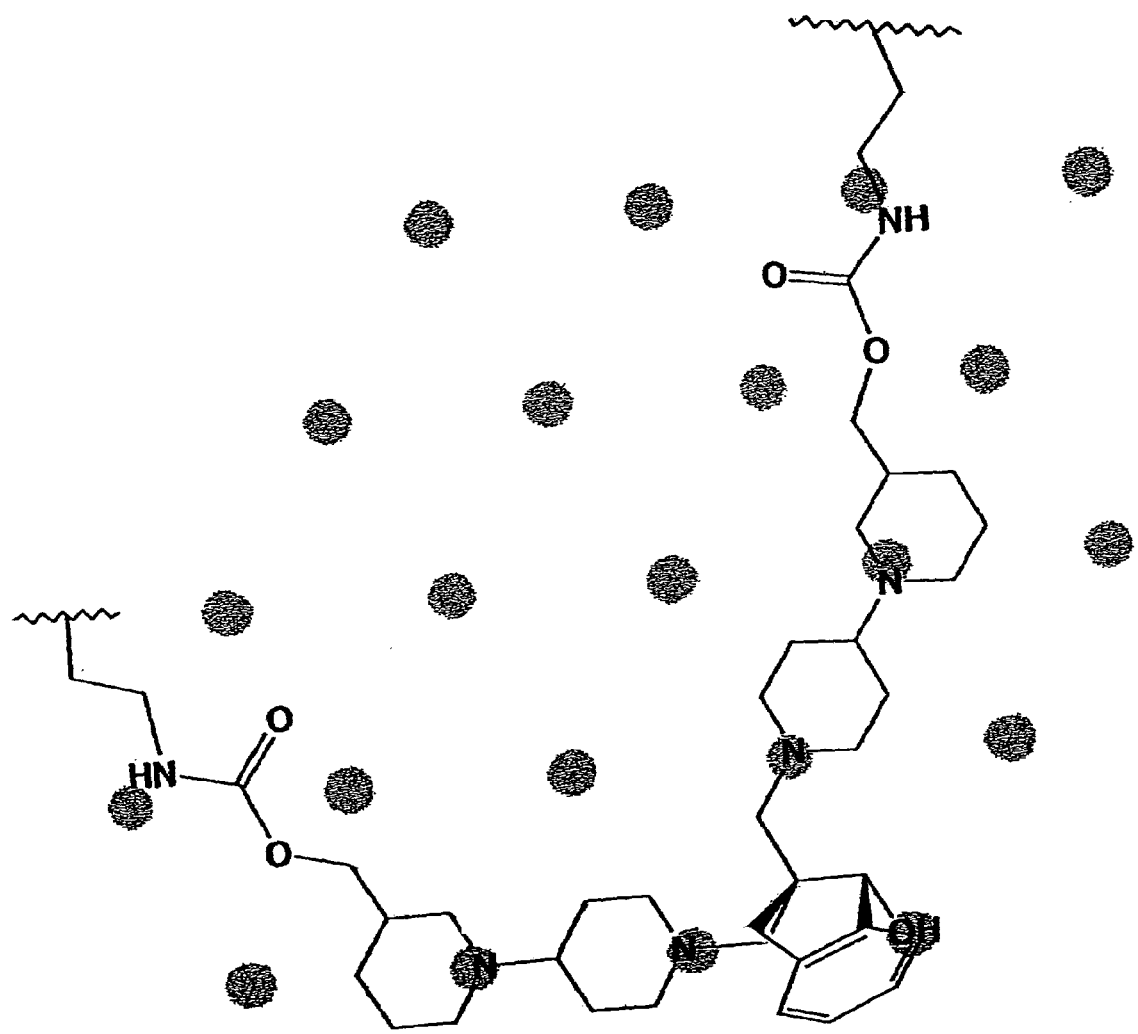
FIG. 4 Binding of an indanone polymer to an ice lattice. The Shaded circles represent the position of surface water molecules on the ice.
Figure 5:
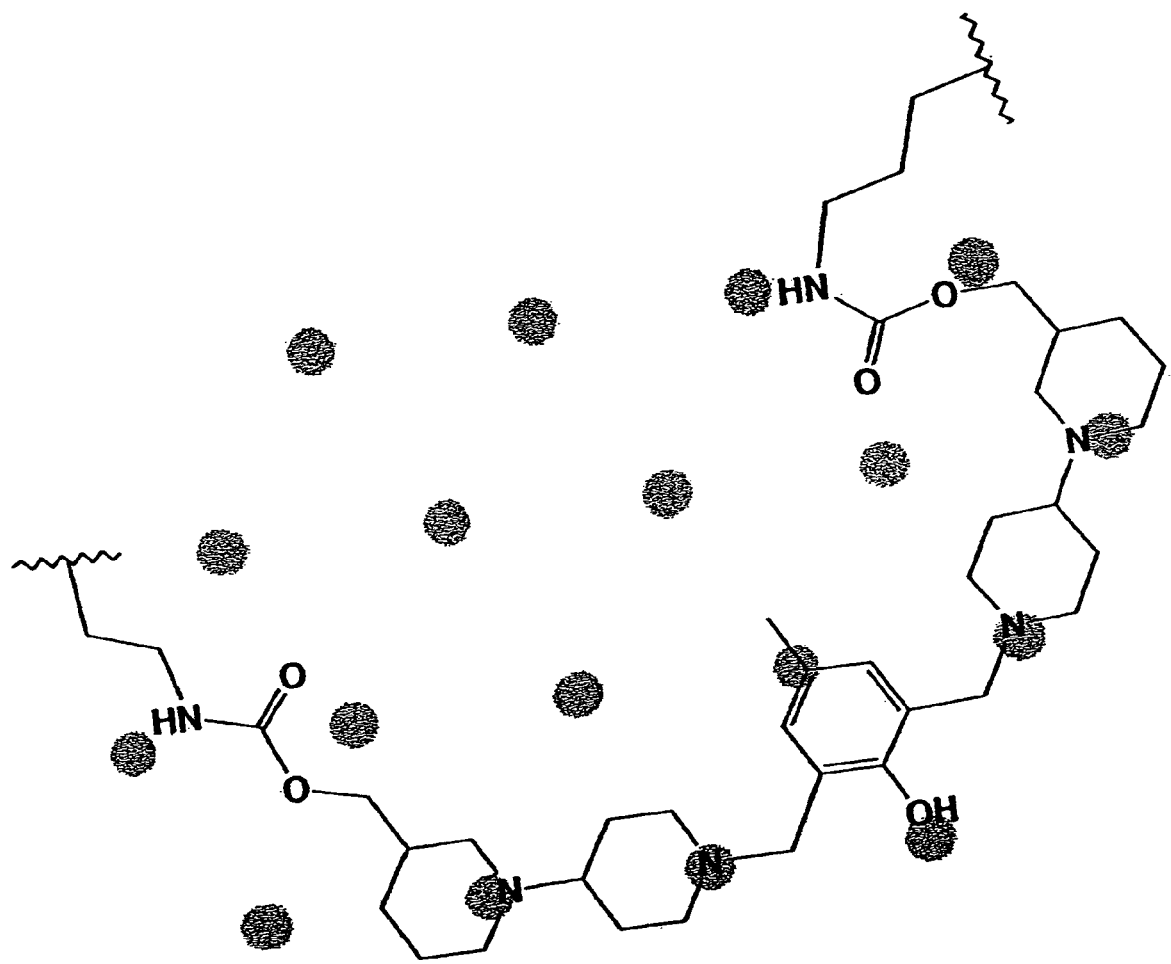
FIG. 5 Binding of a phenol-derived polymer to an ice lattice. The Shaded circles represent the position of surface water molecules on the ice.
Figure 6:
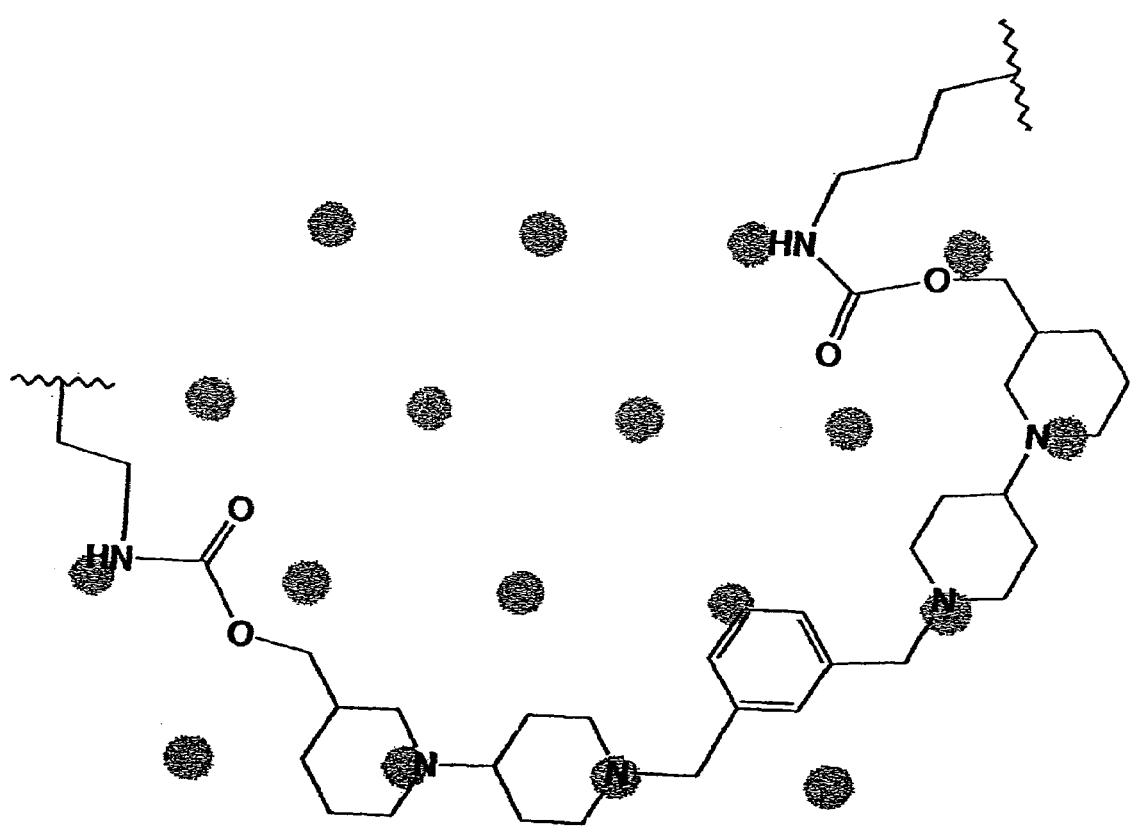
FIG. 6 Binding of xylylene polymer to an ice lattice. The Shaded circles represent the position of surface water molecules on the ice.

The polyamine type polymers are illustrated in FIGS. 4–6. Each of these compounds and similar compounds can be assembled using well-known organic reactions.

Unlike the silicates, the distance between the gripping atoms (in this case both oxygen and nitrogen) in the organic compounds is significantly short of 4.5 Angstroms. Therefore, gripping molecules of this type cannot be made arbitrarily large, because the size discrepancy would cause part of the molecule to be misaligned vs. ice and not grip.

8. Indanol Polymers

A polyamine polymer useful for increasing traction on ice is the indanol polymer:

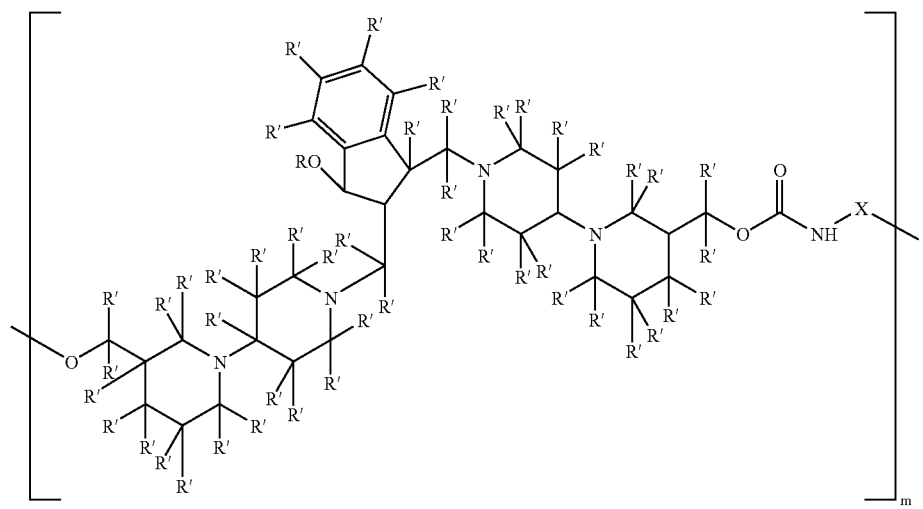

where X can be an alkyl, substituted alkyl, branched alkyl, n-alkyl, iso-alkyl, $(CH_2)_n$, $CH_3(CH_2)_n$, carboxyl, epoxy, amine, an alkene group, an alkyne group, or heteroatoms; R can be a H, $CH_3$, $C_2H_5$, branched alkyl, n-alkyl, iso-alkyl, or alkyl groups substituted with further functional groups of their own, such as hydroxyl, carboxyl, epoxy, amine, alkene, alkyne, or heteroatoms; each R' can independently be an H group, a $CH_3$ group, Cl, F, Br, $C_2H_5$ group, or an alkyl, alkene, alkyne group or an alkyl group substituted with an additional group; and m is an integer from 1 to 40,000.

This polymer has 4-piperidylpiperidinylmethyl moieties located on the 2-position of the indyl ring. The distance between the N in the two adjacent rings can be determined from calculations done on similar molecules (Jones et al. (1979), Birknes (1977), Nordenson and Jeffrey (1980) and Van Opdenbosch and Evrard (1977)).

9. Phenol Polymers

Another polyamine polymer useful for increasing traction on ice the phenol polymer:

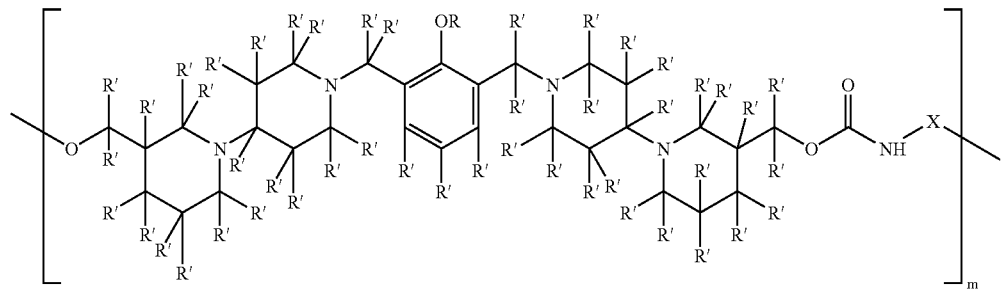

where X can be an alkyl, substituted alkyl, branched alkyl, n-alkyl, iso-alkyl, $(CH_2)_n$, $CH_3(CH_2)_n$, carboxyl, epoxy, amine, alkene, alkyne, or heteroatoms, R can be an H, alkyl, substituted alkyl $CH_3(CH_2)_n$, a polymer, a copolymer, a copolymer bonded to a rubber polymer or a rubber polymer; R' can be an H, $CH_3$, alkyl, heteroalkyl, a substituted heteroalkyl, a polymer, a copolymer, a copolymer bonded to a rubber polymer or a rubber polymer.

In particular embodiments, R is H. However some OHs will react during polymerization to give urethane moieties. Thus, the polymer will have some crosslinking. This polymer as well as the binding on the surface of an ice crystal is shown in FIG. 5.

10. Xylylene Polymers

A xylylene polymer is another polyamine polymer useful for increasing traction on ice:

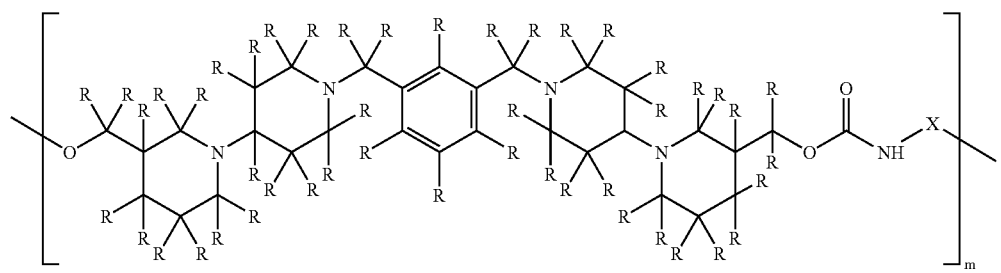

X can be an alkyl, substituted alkyl, branched alkyl, n-alkyl, iso-alkyl, $(CH_2)_n$, $CH_3(CH_2)_n$, carboxyl, epoxy, amine, alkene, alkyne, heteroatoms, a polymer, a copolymer, a copolymer bonded to a rubber polymer or a rubber polymer; each R can be an H, $CH_3$, alkyl, heteroalkyl, a substituted heteroalkyl, a polymer, a copolymer, a copolymer bonded to a rubber polymer or a rubber polymer; and m can be an integer from 1 to 40,000.

This polymer as well as the binding on the surface of an ice crystal is shown in FIG. 6.

C. Synthetic Route for Silicate Polymers

The silicate polymers of the current invention can be prepared by several methods known in the art. Polymers have been produced by silylation of mineral silicates. For examples of mineral silylation, see Hefner et al. (1982) and Frazier et al., (1967). The silicate polymers should be accessible in two steps: 1) crystallize an appropriate chain silicate, and 2) silylate the chain. A polymer that can be made in two steps should be cheaper than one that can be made in four or five steps.

Figure 9:
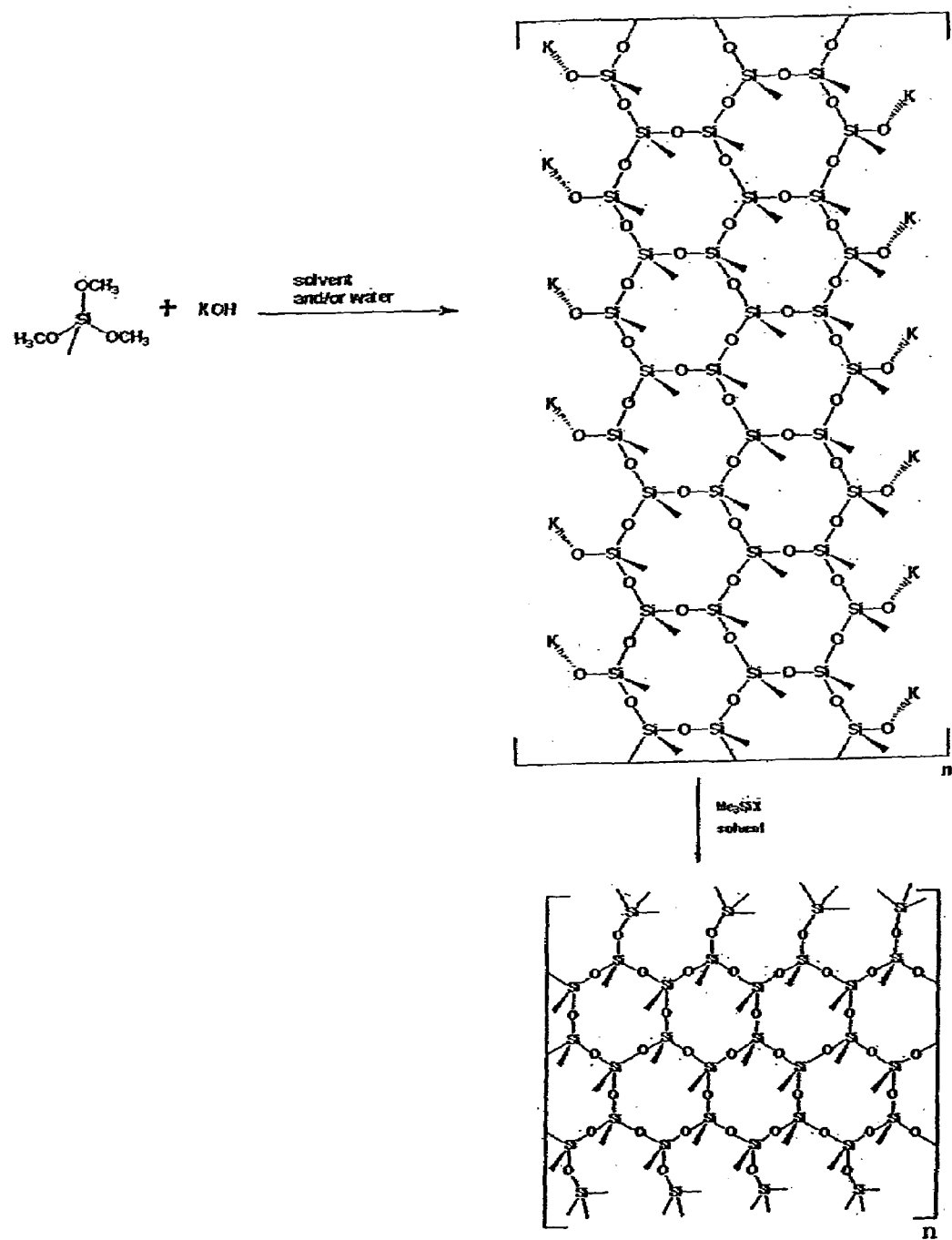
FIG. 9 Synthesis of a silicate polymer. K ions at the edge of one chain are complexed by the rings in another. X can be any leaving group such as a halide, a sulfonate, a carboxylate or an alkoxide.

A $Si_6O_6$ ring polymer can be produced from tetramethoxysilane by mixing the silane with KOH in an organic solvent or water plus an organic solvent. This reaction is shown in FIG. 9. Other reagents similar to the ones shown may also be used. The K ions at the edge of the chains are complexed by the rings in another chain. Further complexation is accomplished by adding $R_3SiX$ where X is any reasonably good leaving group, such as a halide, sulfate, carboxylate, alkoxide, etc and R is H, $CH_3$, $C_2H_5$, $O$-$SiR'_3$, n-alkyl, branched alkyl, iso-alkyl, alkene, alkyne, arene, an alkyl, alkene, alkyne or arene group substituted with further functional groups of its own. In one particular embodiment, R is a methyl group. During the silylation process not all of the silanolate groups in the silicate will bind with a $R_3Si$ group, but end up as Si—OH. This should not adversely affect binding.

The $Si_4O_4$ ring polymer can be produced by hydrolyzing methyltrimethoxysilane. Modifiers may be added to the $Si_4O_4$ ring polymer. These modifiers, including 3-aminopropyltrimethoxy silane and N-(2-aminoethy)-3-aminopropyltrimethoxysilane, can be added to the reaction after the polymer fibers and/or crystals have started growing and are added with additional methyltrimethoxysilane. When the modifier is added after allowing the polymer to grow for several days, the nitrogen-containing chains of the polymer will be predominantly on the end of the polymer chain. Most of the R groups will be methyl groups with only a small percentage being amines. Because the center of the chains have the same structure as the polymer prepared without the modifier present, the polymer will be like a block copolymer.

It is known in the art that the mechanism for hydrolysis of ethoxy silanes is similar to that of methoxy silanes, although they do normally have slower reaction rates. It is understood that ethoxy silanes, or other silanes with appropriate leaving groups can be used in place of any methoxy silane described herein.

Figure 10:
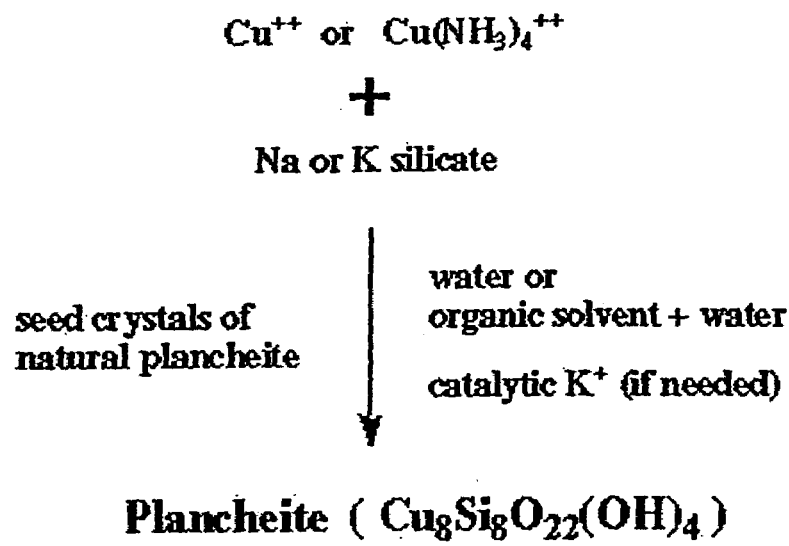
FIG. 10 Synthesis of a plancheite.
Figure 10:
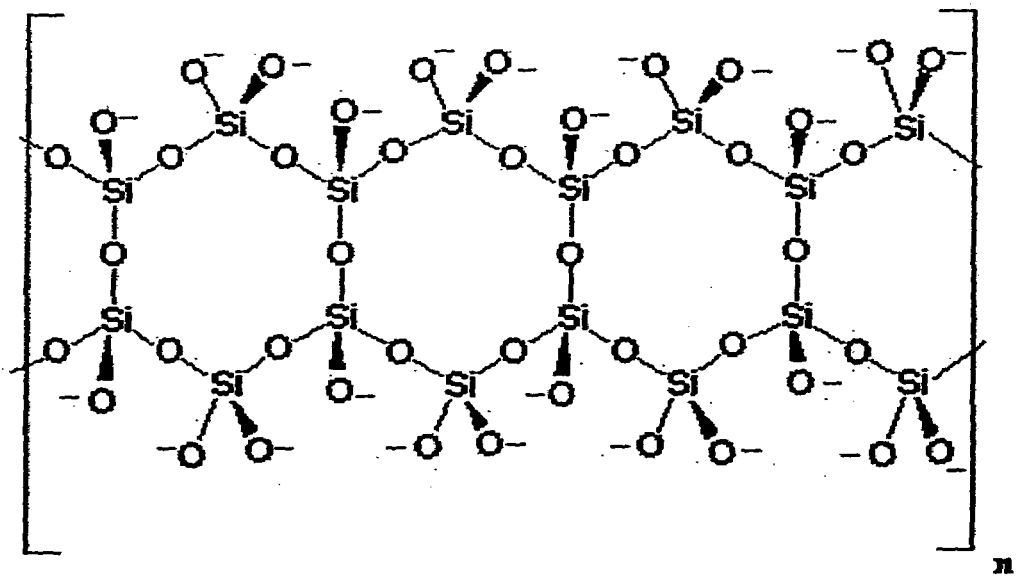
Figure 11:
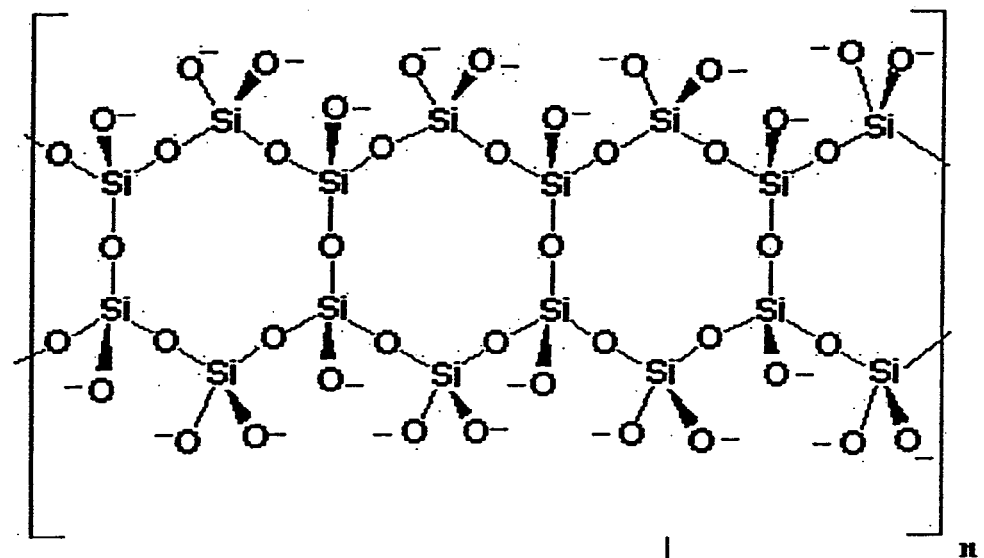
FIG. 11 Synthesis of one embodiment of the present invention from plancheite. X is any reasonably good leaving group, such as a halide, sulfonate, carboxylate or alkoxide. HY represents an acid; it may be HF, HCl, a carboxylic acid, etc. R can be an H, $CH_3$, $C_2H_5$, O—$SiR'_3$, n-alkyl, branched alkyl, iso-alkyl, alkene, alkyne, arene, an alkyl, alkene, alkyne or arene group substituted with further functional groups of its own.
Figure 11:
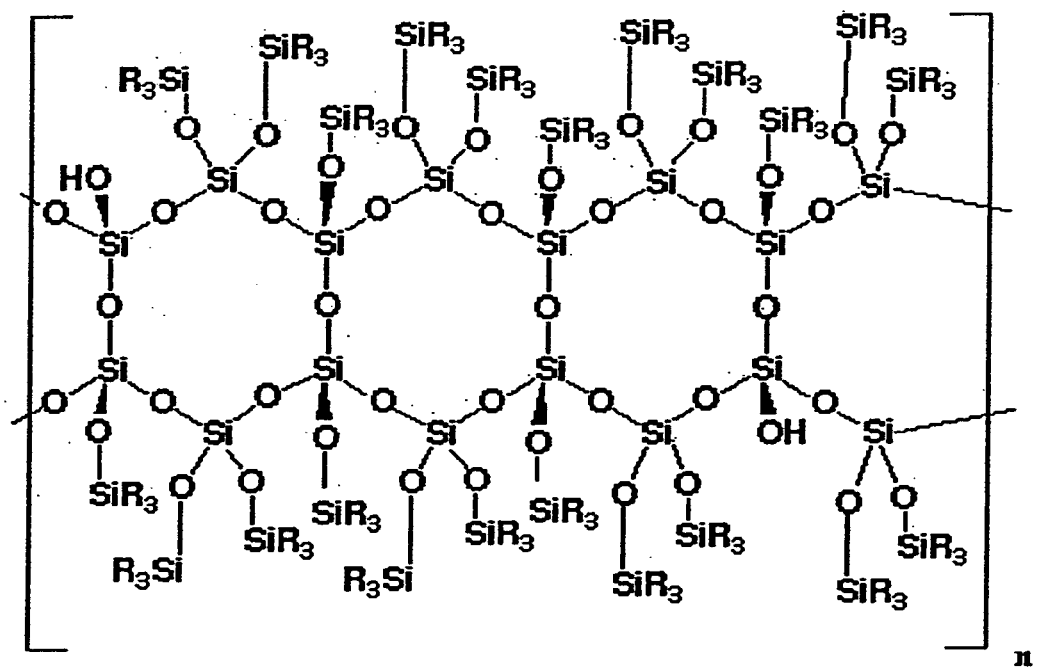
Figure 12:
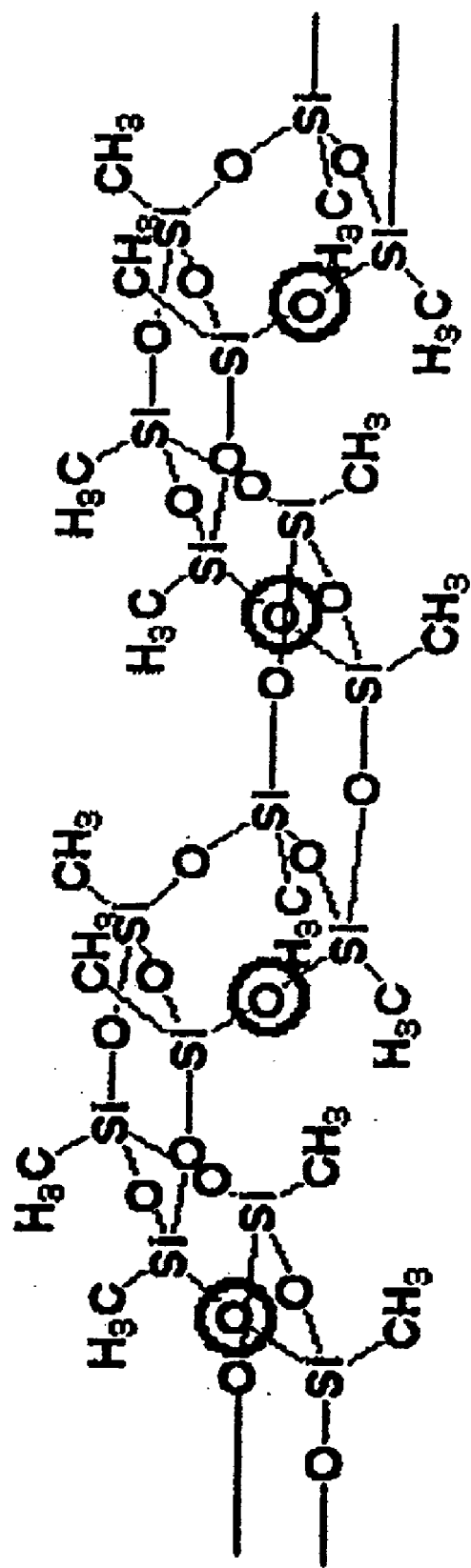
FIG. 12 $Si_4O_4$ polymer binding to an ice lattice. A two repeat unit of an $Si_4O_4$ polymer is shown. The encircled oxygen atoms can be used to bind to ice.
Figure 13D:
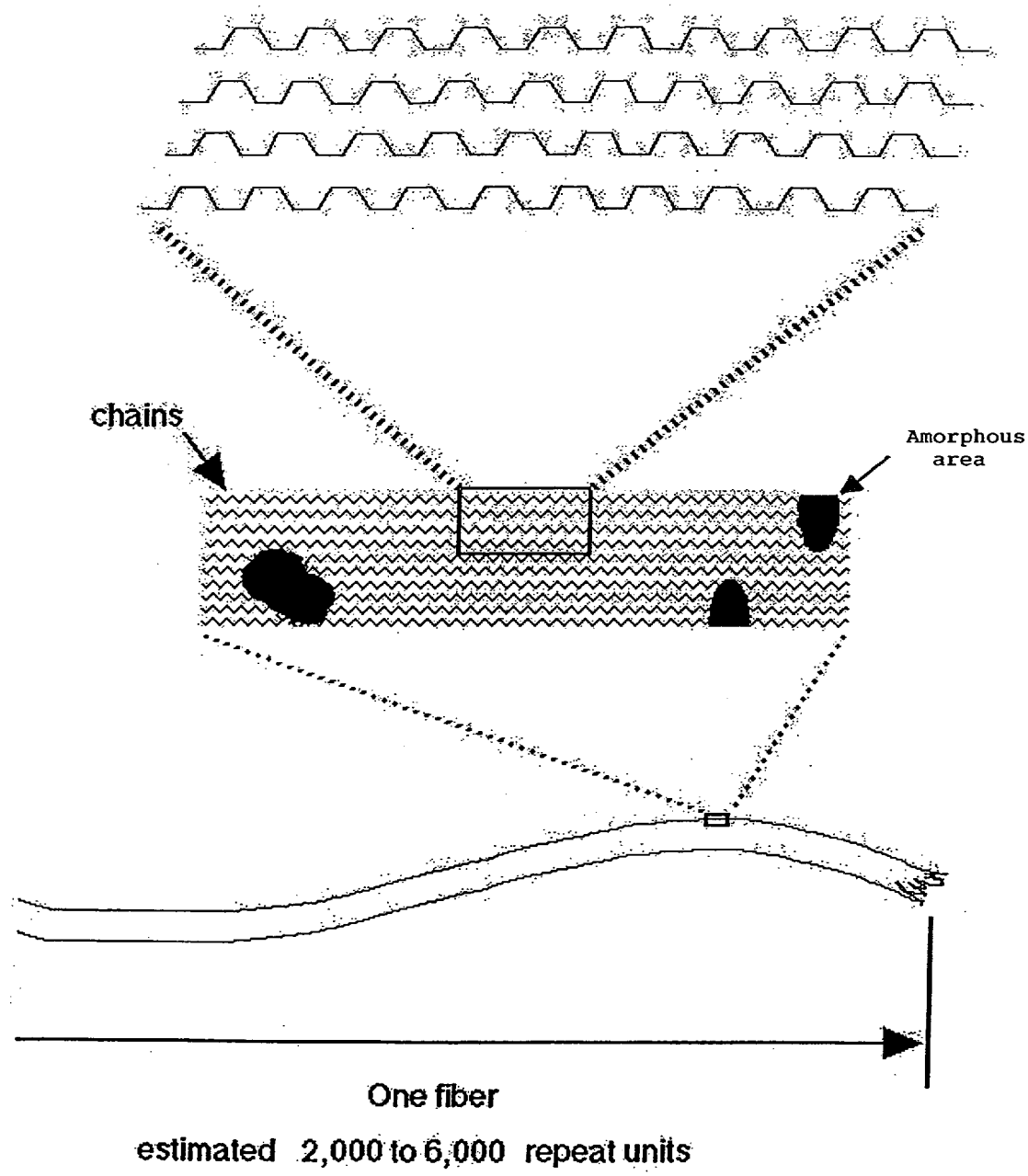
Figure 13E:
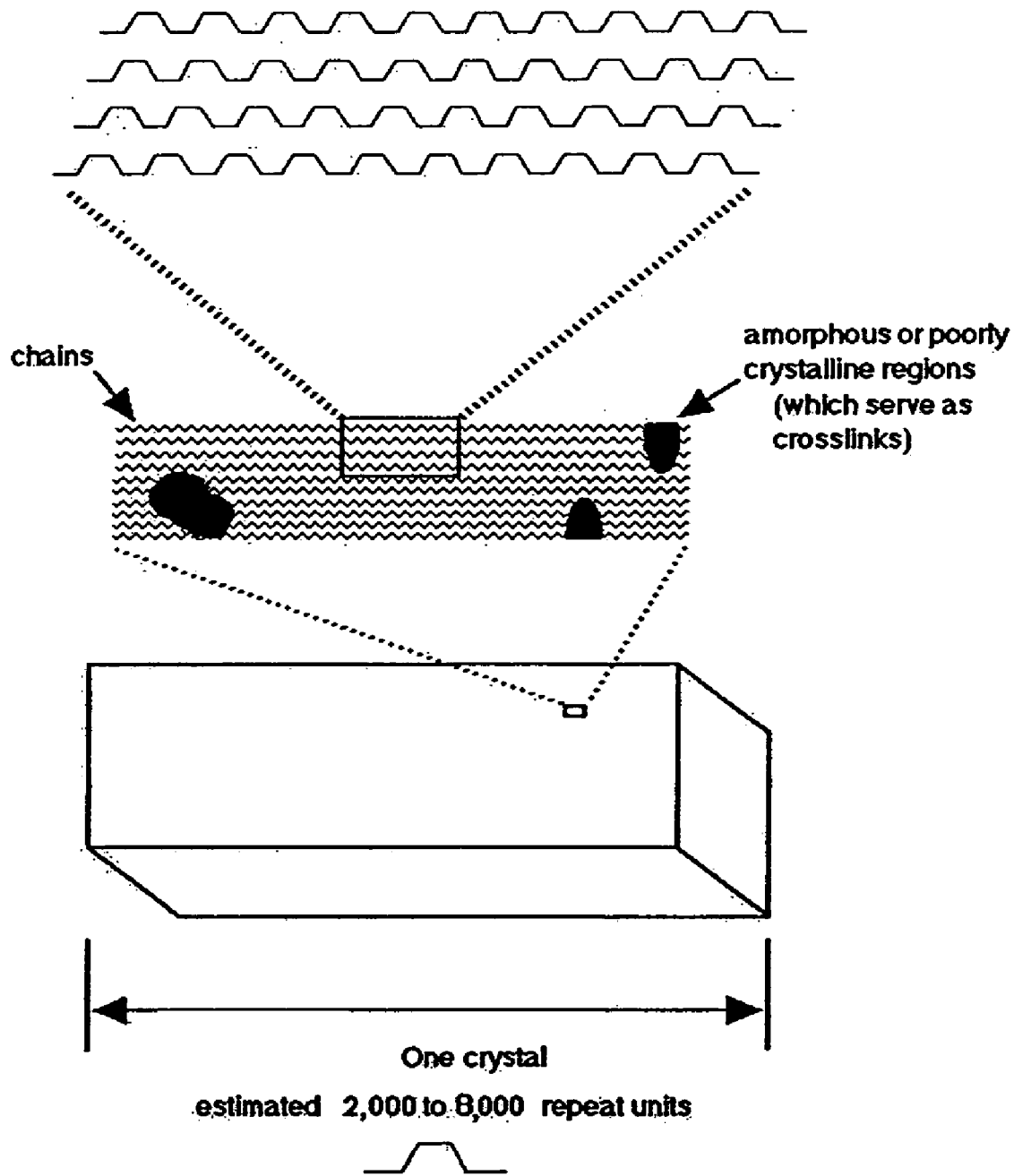
Figure 14A:
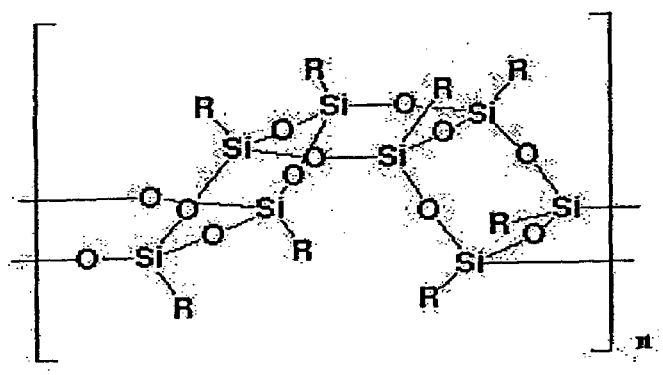
FIG. 14A, FIG. 14B and FIG. 14C.
Figure 14A:
Figure 14B:
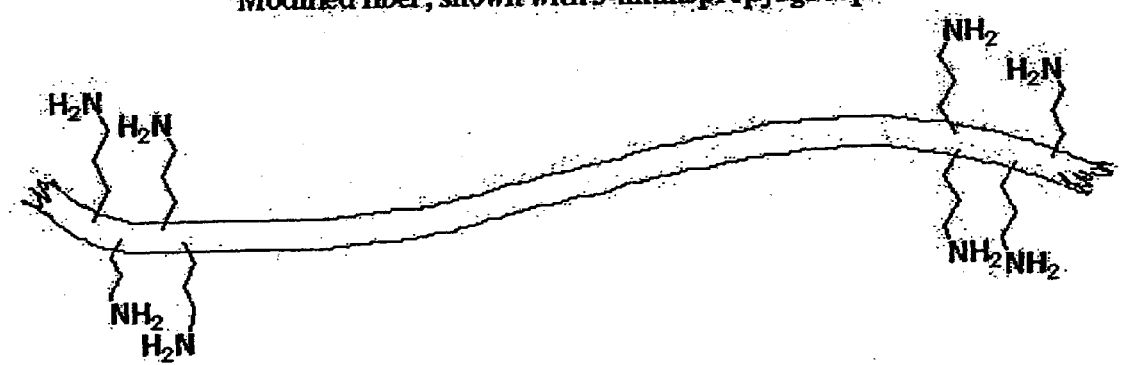
Figure 14C:
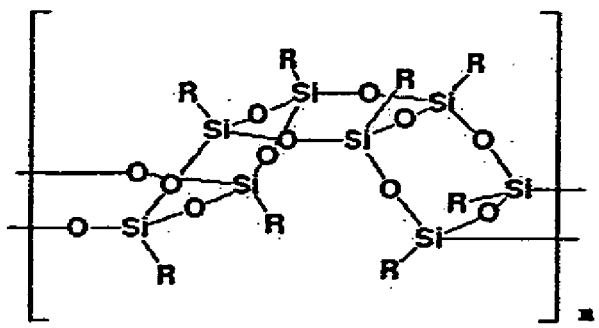
Figure 14C:
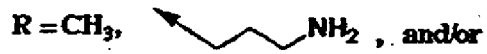
Figure 14C:
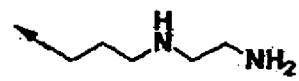
Figure 14C:
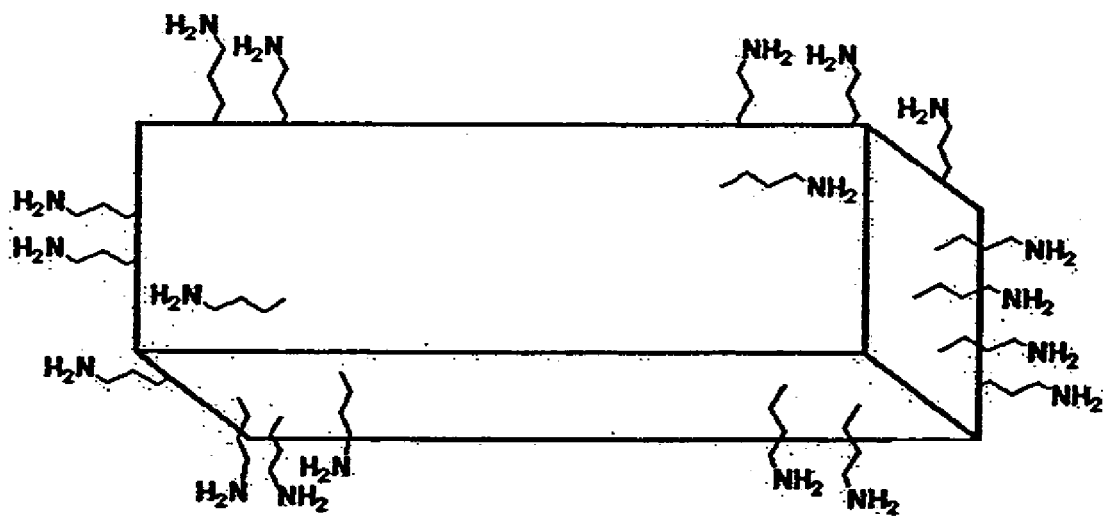
Figure 15:
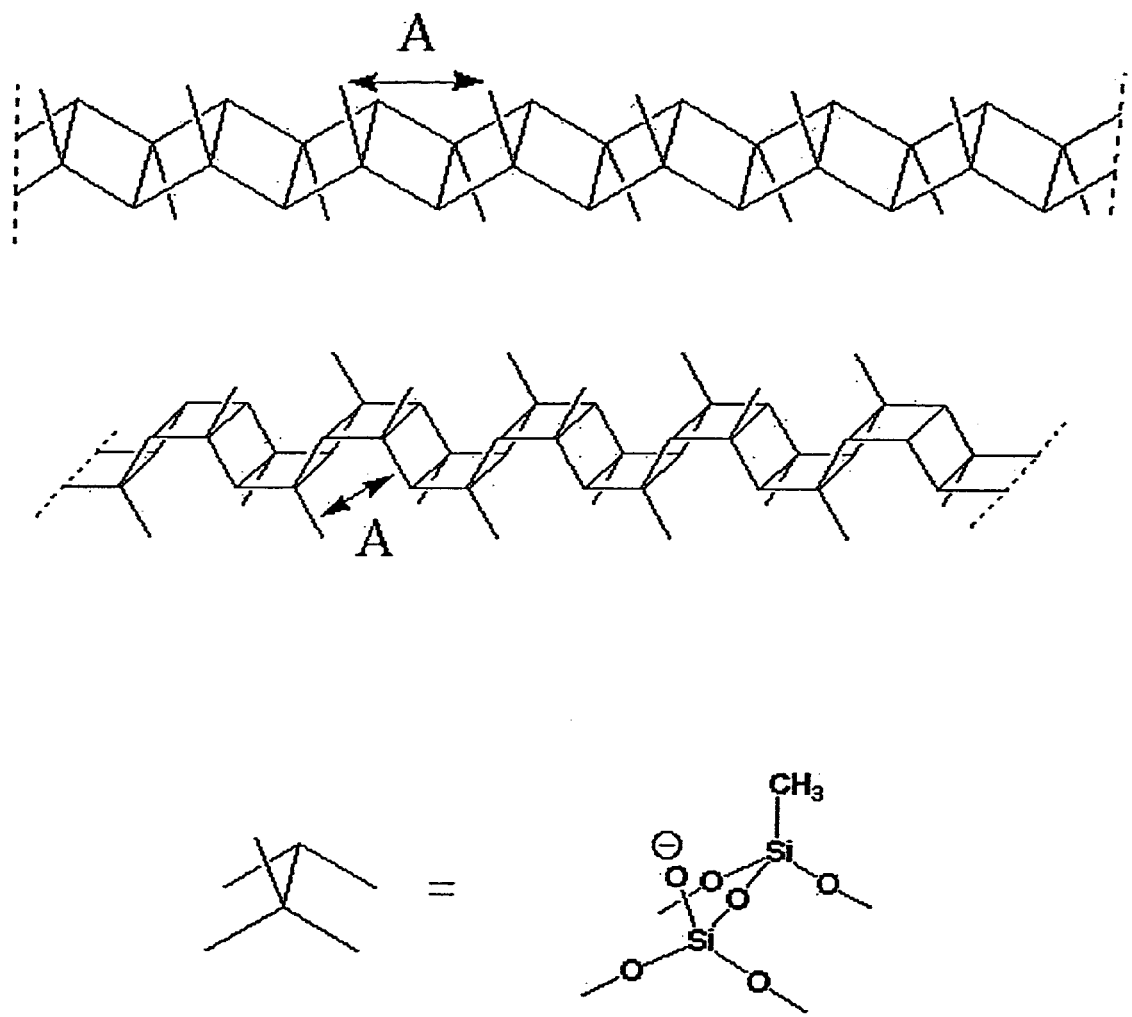
FIG. 15 Two additional silicate polymer chains. A is about 4.51 Angstroms in length.

The plancheite-derived polymer of the current invention can be derived from plancheite in a two step process. Hefner et al. and Frazier et al. have both demonstrated the feasibility of converting a mineral into an artificial silicate polymer. (1982, 1967). In the synthesis, as shown in FIG. 10, the appropriate chain silicate is crystallized and then silyated. $Cu^{++}$ or $Cu(NH_3)_4^{++}$ is combined with Na or K silicate and seed crystals of natural plancheite in water or an organic solvent plus water to produce $Cu_8Si_8O_{22}(OH)_4$. A catalyst such as $K^+$ may be added if needed. This composition is then reacted with $R_3SiX$, HY and a solvent to produce $CuY_2$ and the product. Alternatively, the intermediate composition is reacted with $R_3SiH$ or the dimer $R_3SiSiR_3$, a solvent, and a catalyst to produce Cu and the product. X is any reasonably good leaving group, such as a halide, sulfonate, carboxylate, alkoxide, etc., HY represents an acid; it may be HF, HCl, a carboxylic acid, etc., and R is H, $CH_3$, $C_2H_5$, $O—SiR'_3$, n-alkyl, branched alkyl, iso-alkyl, alkene, alkyne, arene, an alkyl, alkene, alkyne or arene group substituted with further functional groups of its own.

Ligands other than the ones described above may also be used for the R, X and Z groups. Ligands that do not sterically interfere with the spacing between hydrogen bonding elements by increasing the spacing significantly beyond the optimal 4.5 Angstroms may be used. Such ligands include an alkane, an alkene, an alkyne, a diene, an arene, an alkyl halide, an alkenyl halide, an aryl halide, an alcohol, a phenol, an ether, an epoxide, an aldehyde, a ketone, a carboxylic acid, an ester, an amide, an imide, an amine, a hydroxylamine, a dihydroxyamine, a lactam, a lactone, a hydrazine, a nitrile, an azo-compound, a diazonium compound, a compound with three or more N-atoms, a nitro compound, a halogen, a cyano, an oxo-compound, a thio-acid, an imidic acid an acyl halide, an acid anhydride a sulfinic acid, a sulfonic acid, a seleninic, selenonic, or tellurinic acid, a keto acid, an acid amide, a sulfide, a disulfide, a sulfoxide, a sulfone, an olefin, or a diolefin. In certain embodiments, the polymer may comprise of, but is not limited to a diasteriomer, an enantiomer, or a racemic mixture of stereoisomers.

As used herein, the term "alkyl" refers to the saturated aliphatic groups, including straight-chain alkyl groups, branched-chain alkyl groups, cycloalkyl (alicyclic) groups, alkyl substituted cycloalkyl groups, and cycloalkyl substituted alkyl groups. The alkyls of the current invention are preferably from between 1 and 20 carbons in length.

The term "n-alkyl" refers to alkyls that have a straight chain, such as n-propane, n-butane, n-pentane, n-hexane etc.

The term "branched alkyl" refers to alkyls with one or more branch off of the hydrocarbon backbone. Such moieties can include, for example, t-butyl, isopropyl, sec-butyl, etc.

The term "iso-alkyl" refers to alkyls with a branch off the hydrocarbon backbone where the branch is at end of the backbone remote from the attachment point.

The terms "substituted alkyl" and "alkyl substituted with an additional group" both refer to alkyl moieties having moieties replacing a hydrogen on one or more carbons of the hydrocarbon backbone. Such moieties can include, for example, halogen, hydroxyl, alkylcarbonyloxy, arylcarbonyloxy, alkoxycarbonyloxy, aryloxycarbonyloxy, carboxylate, alkylcarbonyl, alkoxycarbonyl, aminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), amidino, imino, sulfhydryl, alkylthio, arylthio, thiocarboxylate, sulfate, sulfonato, sulfamoyl, sulfonamido, nitro, trifluoromethyl, cyano, azido, heterocyclyl, aralkyl, or an aromatic or heteroaromatic moiety. It will be understood by those skilled in the art that the moieties substituted on the hydrocarbon chain can themselves be substituted, if appropriate. Cycloalkyls can be further substituted, e.g., with the moieties described above. The substituted alkyls may be branched.

The term "alkene" refers to unsaturated aliphatic groups having at least one degree of unsaturation. Alkenes include including linear alkene groups, branched-chain alkene groups, cycloalkene groups, alkyl substituted cycloalkene groups, and cycloalkyl substituted alkene groups. The alkenes of the current invention are preferably from between 1 and 20 carbons in length and have one or more double bond.

The term "alkyne" refers to unsaturated aliphatic groups having at least one triple bond. Alkynes include including linear alkyne groups, branched-chain alkyne groups, and cycloalkyl substituted alkyne groups. The alkynes of the current invention are preferably from between 1 and 20 carbons in length and have one or more triple bond.

As used herein, the term "halogen" designates —F, —Cl, —Br or —I; the term.

The term "alkylcarboxyl" as used herein means an alkyl group, as defined above, having a carboxyl group attached thereto.

The term "alkoxy," as used herein, refers to a moiety having the structure —O-alkyl, in which the alkyl moiety is described above.

The term "arene," as used herein includes 4- and 6-membered ring aromatic groups that may include from zero to four heteroatoms, for example, unsubstituted or substituted benzene, pyrrole, furan, thiophene, imidazole, oxazole, thiazole, triazole, pyrazole, pyridine, pyrazine, pyridazine and pyrimidine, and the like. Arene groups also include polycyclic fused aromatic groups such as naphthyl, quinolyl, indolyl, and the like. The aromatic ring can be substituted at one or more ring positions with such moieties, e.g., as described above for alkyl groups. Preferred aryl groups include unsubstituted and substituted phenyl groups.

The term "aryloxy," as used herein, refers to a group having the structure —O-aryl, in which the aryl moiety is as defined above.

The term "epoxy," as used herein, refers to a group having an oxygen atom joined to two different groups such as alkyls as described above.

The term "amine," as used herein, refers to —$NH_2$ or an unsubstituted or substituted moiety of the formula —$NR_aR_b$, in which $R_a$ and $R_b$ are each independently hydrogen, alkyl, aryl, or heterocyclyl, or $R_a$ and $R_b$, taken together with the nitrogen atom to which they are attached, form a cyclic moiety having from 3 to 8 atoms in the ring. Thus, the term "amino" is intended to include cyclic amino moieties such as piperidinyl or pyrrolidinyl groups, unless otherwise stated. An "amino-substituted amino group" refers to an amino group in which at least one of $R_a$ and $R_b$, is further substituted with an amino group.

D. Materials having Increased Friction

It is contemplated that the polymers of the current invention will be either formed into a material, (e.g., a shoe sole or tire tread), formed as the outer layer of the material, or located on the surface of the material. As a non-limiting example, the material may be a butadiene rubber, silicone rubber or any other polymer or copolymer commonly used in forming shoe soles or tire treads. In other embodiments, the material may be a cloth, polyurethane or polyester. Preferably, the present compositions can remain on the surface of the material or article of manufacture for the lifetime of the object and continuously impart increased friction when used in icy conditions. The materials may be formed into, for example, snow tires or tire tread, all weather tires or tire tread, shoe soles, over-shoe soles, boat soles, apparatus attachable to the bottom of shoes, ski skin, gloves, cane tips, crutch tips, snowshoes, ice tongs, ski poles, tank treads or shoe coverings that fit over a shoe.

EXAMPLES

The following example is included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

The Manufacture of a $Si_4O_4$ Polymer

Batch 1. A Si4O4 ring polymer was produced by reacting 0.9 mL (6 mmol) of methyltrimethoxysilane with 2 mmol KOH (2 mL of 1M solution in methanol) and 0.5 mL water (28.6 mmol) in 10 mL methanol in the presence of 1 mL ethylene glycol (1.8 mmol) and 0.198 g potassium acetate (2 mmol). The order of addition was potassium acetate, methanol, KOH, ethylene glycol, methyltrimethoxysilane, and water. The reaction mixture was studied under a microscope at 150× magnification until it could be discerned that crystalline material was forming (tiny fibers, rectangles and small and large cubes; the large cubes apparently are consumed as the reaction continues, because they are not found in the final product). The mixture was stirred overnight, filtered, and the filter cake washed 3× with methanol, then sucked dry. 242 mg of a white powder was obtained ("Batch 1").

Batch 2. The above mixture was scaled up as follows: KOH (1.12 g, 20 mmol) and potassium acetate (1.96 g, 20 mmol) were dissolved in methanol (110 mL). Ethylene glycol (10 mL, 18 mmol) was added, followed by methyltrimethoxysilane (8.6 mL, 60 mmol), water (5 mL, 278 mmol), and 101 mg of Batch 1 to serve as seed crystals. The reaction mixture was stirred at room temperature for six days, then filtered, washed 3× with methanol (using a total of 31 mL), then sucked dry for one hour. 4.045 g of a white powder was obtained. The infrared spectrum of this compound ("Batch 2") is identical with that of Batch 1. Batch 2 was subjected to X-ray powder diffraction. It was observed that Batch 2 comprised mostly crystalline, showing planes of atoms at separations of 8.407 Angstroms, 4.194 Angstroms, 3.920 Angstroms, 3.585 Angstroms, and 3.482 Angstroms.

When a spatula carrying a small amount of Batch 2 was wiped on the surface of an ice cube, the material came off the spatula and adhered to the ice.

Batches 3 and 4. Batch 2 was in turn used to provide seed crystals to two other batches of material, which were modified by addition of "handles", specifically aminoalkyl groups, to use to attach to other polymer molecules. The preparation of both batches began by dissolving KOH (2.29 g, 41 mmol) and potassium acetate (4.02 g, 41 mmol) in methanol (221 mL) at room temperature followed by, in this order, ethylene glycol (20.5 mL, 368 mmol), methyltrimethoxysilane (17.2 mL, 121 mmol), water (10 mL, 556 mmol) and Batch 2 (300 mg). Both of the reaction mixtures (identical at this point) were stirred for 3 days at room temperature. At this point one (Batch 3) was treated with, in the following order, water (5 mL, 278 mmol), methyltrimethoxysilane (15 mL, 106 mmol), and technical grade (80%) N-(2-aminoethyl)-3-aminopropyltrimethoxysilane (7 mL, approx. 26 mmol). The second reaction mixture (Batch 4) was treated with, in the following order, water (5 mL, 278 mmol), methyltrimethoxysilane (15 mL, 106 mmol), and 3-aminopropyltrimethoxysilane (7 mL, 39.7 mmol). These reaction mixtures were stirred for three days and three hours at room temperature. Stirring was stopped and the products allowed to settle.

Part of the reaction mixture was decanted away from Batch 3, and the rest of the mixture filtered, then washed 2× with methanol, using a total of 60 mL. The filter cake was then sucked dry and weighed. 9.067 g of a white powder was obtained.

Batch 4 was worked up differently. After it had settled, the supernatant was decanted, and 100 mL of methanol was added. Batch 4 was re-suspended and allowed to settle. The methanol was decanted and what was left was filtered and washed again with methanol and sucked dry to yield 9.69 g of a white powder.

The infrared spectrum of Batch 3 and Batch 4 are very similar to that of Batch 2. The only difference is a weak broad NH stretch centered around 3300 cm-1.

The behavior of these materials towards aqueous acid. A sample of Batch 2 was added to 3% aqueous sulfuric acid in a vial and shaken. Samples of Batch 3 and 4 were treated likewise. The Batch 2 material, which is hydrophobic, could not be induced to enter the liquid, regardless of how much it was shaken. Batches 3 and 4 went into suspension. Upon addition of NaOH solution until the mixture was alkaline, Batch 3 and 4 material partially came out of suspension and floated on the surface of the liquid. The difference in behavior towards acid shows that the aminoalkyl "handles" have been incorporated into the polymer.

Example 2

Attaching the $Si_4O_4$ Polymer to a Solid Support

Two methods of attaching the polymer to a solid support, in this case cotton cloth, were examined.

Method 1. In the first method, cotton cloth was wet with a solution of linseed oil in methylene chloride (1:3 by volume). After evaporation of the methylene chloride, either Batch 3 or Batch 4 material (as discussed in example 1) was placed on the surface of the cloth. This was allowed to dry for 10 days. A control strip was prepared with linseed oil, as above, but no material from either Batch 3 or 4.

Method 2. In the second method, epoxy glue was mixed and applied to the cloth, followed by the addition of the Batch 3 or 4 material to the cloth. This was allowed to dry overnight. A control strip of cloth was prepared as above with epoxy glue but no material from either Batch 3 or 4.

Results. A testing apparatus was built that held the cloth strips between two pieces of ice while applying tension. At first the cloth strips bearing material from Batch 3 or 4, attached by Method 1, required up to 2.4× as much tension to pull them free as did the control strips.

Example 3

Manufacture of a $Si_6O_6$ Polymer

A $Si_6O_6$ ring polymer can be produced by mixing an alkyltrimethoxysilane with KOH in an organic solvent such as methanol, ethanol or hexane or in a solution of water plus an organic solvent. After allowing the silane to react for several hours to several days, the resulting chain silicate was filtered, washed with solvent and dried. It was then treated with trimethylchlorosilane or another monofunctional silane.

The resulting polymer was treated with an appropriate solvent such as chloroform, chlorobenzene, pyridine, or methyl benzoate, until it either dissolved or became relatively fluid. Said fluid or solution was used to prepare sheets of the polymer.

Example 4

Manufacture of a Plancheite-Derived Polymer

A plancheite-derived polymer can be produced by first obtaining plancheite and derivatizing it as discussed below.

In particular embodiments, the polymer can be made by synthesizing plancheite because natural plancheite varies widely in quality. This can be done in solution (it is clear from examining samples of natural plancheite that it crystallized out of solution, rather than being formed by solid-state chemistry). Cu++ is combined with a sodium silicate and seed crystals of the mineral plancheite in water and/or an organic solvent, to produce Cu8Si8O22(OH)4, which is plancheite itself. (Plancheite possesses a double chain of silicon and oxygen atoms; the artificial material may have triple or wider chains which are also acceptable). A catalyst such as K+, and a buffer or other reagent to control or adjust pH, may be added if desired. This composition is then reacted with trimethylchlorosilane or another monofunctional silane, HY and an organic solvent to produce CuY2 and the plancheite-derived polymer. HY represents an acid; it may be HF, HCl, a carboxylic acid, etc.

Another method of converting plancheite to polymer involves reduction of Cu with simultaneous silylation. Appropriate reagents for this could be produced by reducing a monofunctional silane to give a compound with an Si—H or Si—Si bond. Treating plancheite with these, in the presence of a catalyst such as fluoride, will produce a silicone polymer with Si6O6 rings, along with metallic copper. The resulting polymer was treated with an appropriate solvent such as chloroform, chlorobenzene, pyridine, or methyl benzoate, until it either dissolved or became relatively fluid. The fluid or solution was used to prepare sheets of the polymer.

Although plancheite can be grown from solution, it may be more practical to prepare it via alteration of amorphous copper silicate suspended in an appropriate solvent.

Example 5

Manufacture of a Pinacol Polymer

A "pinacol" oligomer may be produced by reductively oligomerizing 1,4-cyclohexanedione monomers through a reaction similar to the McMurray reaction or the pinacol coupling reaction. These reactions are well-known in the art of organic chemistry. The oligomer can have ketone groups on the ends, which are reduced to OH groups via sodium borohydride.

This oligomer is then attached via an esterification reaction to a copolymer of ethylene and acrylic acid, or a polymer of similar structure, which can be purchased or made by methods well known in the art of polymer chemistry. (Whether the oligomer reacts with the polymer at one end or not is not important to its function; attachment via any OH group will do.) Other polymers with groups reactive towards OH, such as epoxidized rubber, polymers with pendant isocyanate groups, etc. could also be used to anchor the oligomer, even though these do not use an esterification reaction.

Modified oligomers may be prepared from a substituted cyclohexanedione, and/or by attachment of other groups to the OH groups prior to attachment to the polymer, or by using a different reaction, or type of reaction, other than McMurray reaction or the pinacol coupling reaction to prepare the oligomer. For example, 1,4-dinitrocyclohexane (substituted or unsubstituted) plus 1,4-cyclohexanedione (substituted or unsubstituted) under the influence of base, followed by reduction of the $NO_2$ groups to $NH_2$, gives an oligomer in which some of the OH groups have been replaced with $NH_2$ groups. Other groups may or may not be attached to this prior to its attachment to a polymer. A similar sequence could be carried out with the dioxime of 1,4-cyclohexanedione (substituted or unsubstituted) plus 1,4-cyclohexanedione (substituted or unsubstituted), followed by reduction of NO groups to $NH_2$.

This molecule in particular would have another use in addition to gripping ice. The "pinacol" oligomers would also be very sticky towards each other. The pinacol oligomers not only fit into the hydrogen bonding pattern of ice, they also fit into each other. Thus two pieces of this polymer would adhere to one another like two magnets.

All of the compositions and methods disclosed and claimed herein can be made and executed without undue experimentation in light of the present disclosure. While the compositions and methods of this invention may have been described in particular terms, those of skill in the art appreciate that variations of these compositions, and in the steps or in the sequence of steps of the methods described herein, may be practiced without departing from the concept, spirit and scope of the invention. More specifically, it will be apparent that agents that are chemically and/or physiologically related may be substituted for the agents described herein while the same or similar results would be achieved.

REFERENCES

The following references, to the extent that they provide exemplary procedural or other details supplementary to those set forth herein, are specifically incorporated herein by reference.

U.S. Pat. No. 4,427,831
U.S. Pat. No. 4,918,142
U.S. Pat. No. 5,530,040

U.S. Pat. No. 5,681,874
U.S. Pat. No. 5,788,786
U.S. Pat. No. 5,833,779
U.S. Pat. No. 5,873,399
U.S. Pat. No. 5,929,156
U.S. Pat. No. 5,967,211
U.S. Pat. No. 6,003,595
U.S. Pat. No. 6,021,831
U.S. Pat. No. 6,024,824
U.S. Pat. No. 6,026,875
U.S. Pat. No. 6,228,908
U.S. Pat. No. 6,250,354
U.S. Pat. No. 6,258,201
U.S. Pat. No. 6,303,388
U.S. Pat. No. 6,378,584
U.S. Pat. No. 6,497,261
U.S. Patent Application Publication 2002/0026003 A1
U.S. Patent Application Publication 2002/0037950 A1
American Mineralogist, 62:491–502 and 990–998, 1977.
Beaglehole and Nason, *Surface Science*, 96:357–363, 1980.
Birknes, *Acta Cryst.*, B33:2301–2303, 1977.
Crystal Structures, 2nd Ed. 1:322–323, 1963.
Dana's New Mineralogy, 8th Edition, 205–208, 1405, 1444–1451, 1997.
Dear, Howie and Zussman, Geological Society of London, "Rock-Forming Minerals," Vol. 2B, Second Edition, pages 751–756, 1997.
Evans and Mrose, *American Mineralogist*, 62:491–502, 1977.
Fahy et al., *ASME*, 113–146, 1988.
Franks, *Water, A comprehensive Treatise*, 1:119, 1972.
Frazier et al., *Inorganic Chemistry*, 6(9):1693–1696, 1967.
Harrison et al., *Nature*, 328:241–243, 1987.
Haymet et al., *JACS*, 121:941–948, 1999.
Hefner and Kenny. In: *Soluble Silicates*, ACS Symposium Series, 20:319–328, 1982.
Jones et al., *Acta Cryst.*, B35:1732–1735, 1979.
Karim and Haymet, *J. Chem. Phys.*, 89(11):6889–6896, 1988.
Klein an Hurlbut, Jr., In: *Manual of Mineralogy*, 20th edition, 422–423, 1985.
Knight and Wierzbicki, In: *Adsorption of Biomolecules to Ice and Their Effects upon Ice Growth*, Crystal Growth and Design, 1(6):439–446, 2001.
Knight et al., In: *Adsorption of Biomolecules to Ice and Their Effects upon Ice Growth*, Crystal Growth and Design, 1(6):429–438, 2001.
Knight et al., *Nature*, 308:295–296, 1984.
Nordenson and Jeffrey, *Acta Cryst.*, B36:1214–1216, 1980.
Rubinsky et al., *Nature*, 360:113–114, 1992.
Sicherl and Yang, *Nature*, 375:427–431, 1995.
Van Opdenbosch et al., *Acta Cryst.*, B33:595–599, 1977.
Weeks et al., *Acta Cryst.*, B32:2819, 1976.

What is claimed is:

1. A method for increasing traction of an article of manufacture on a surface comprising obtaining a composition comprising a silicate polymer of the formula:

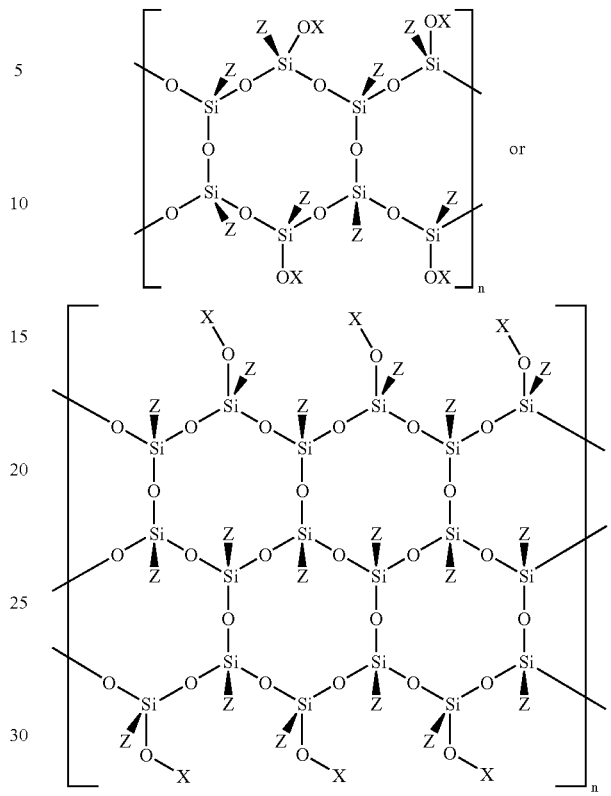

wherein,

X is an $SiR_3$ group, an H group, a $CH_3$ group, $C_2H_5$ group, an n-alkyl group, a branched alkyl group, an iso-alkyl group, a polymer, a copolymer, a copolymer bonded to a rubber polymer, a rubber polymer, or an alkyl group substituted with an alkyl group, a hydroxyl group, a carboxyl group, an epoxy group, an amine group, an alkene, an alkyne, an arene, and a heteroatom or a group of heteroatoms;

R is H, $CH_3$, $C_2H_5$, O—$SiR'_3$, n-alkyl, branched alkyl, iso-alkyl, alkene, alkyne, an alkyl, alkene, alkyne or an arene group;

R' is a polymer;

Z is an H group, a $CH_3$ group, a $C_2H_5$ group, a vinyl group, an n-alkyl group, a branched alkyl group, an iso-alkyl group, or an alkyl group substituted with an additional group;

n is an integer from 1 to 40,000; and attaching the composition to the article of manufacture, wherein the composition increases traction of the article of manufacture on the surface.

2. The method of claim 1, wherein the surface is further defined as an icy surface.

3. The method of claim 1, wherein the polymer is attached to the article of manufacture by a covalent bond, an ionic bond or a hydrogen bond.

4. The method of claim 1, wherein the polymer is attached to the article of manufacture by an adhesive.

5. The method of claim 4, wherein the adhesive is glue.

6. The method of claim 1, wherein X is an $SiR_3$ group.

7. The method of claim 1, wherein Z is a $CH_3$ group.

8. The method of claim 1, wherein the silicate polymer comprises the structure:

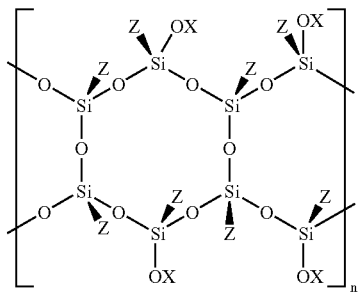

9. The method of claim 1, wherein the silicate polymer comprises the structure:

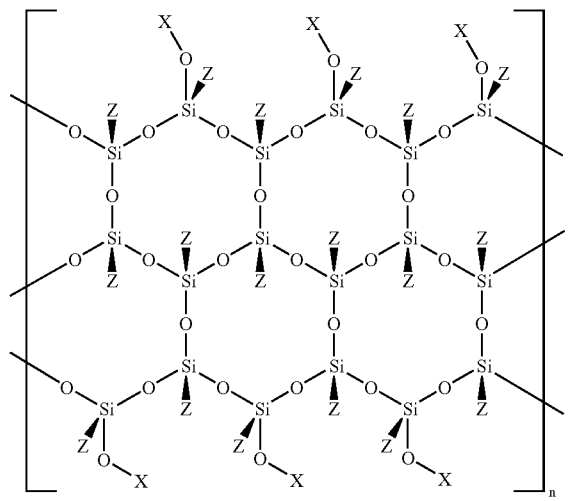

10. The method of claim 1, wherein the article of manufacture comprises rubber, cloth, polyurethane or polyester.

11. The method of claim 1, wherein the article of manufacture is a tire, shoe, boot, glove, cane tip, or crutch tip, snowmobile tread, snowshoe, ice tong, ski pole, tank tread or shoe covering.

12. The method of claim 11, wherein the article of manufacture is a tire.

13. A method for increasing traction of an article of manufacture on a surface comprising obtaining a composition comprising a silicate polymer of the formula:

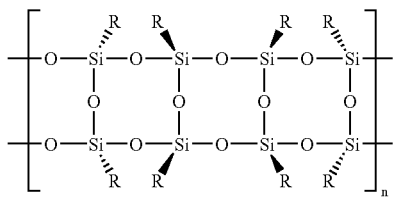

wherein:
R is $CH_3$ or $(CH_2)_3$—$NH_2$;
n is an integer from 1 to 15,000, and attaching the composition to the article of manufacture, wherein the composition increases traction of the article of manufacture on the surface.

14. The method of claim 13, wherein R is $CH_3$.

15. The method of claim 13, wherein R is a combination of $CH_3$ and $(CH_2)_3$—$NH_2$.

16. A method for increasing traction of an article of manufacture on a surface comprising obtaining a composition comprising a plancheite-derived polymer and attaching the composition to the article of manufacture, wherein the composition increases traction of the article of manufacture on the surface.

17. The method of claim 16, wherein the plancheite-derived polymer comprises the formula:

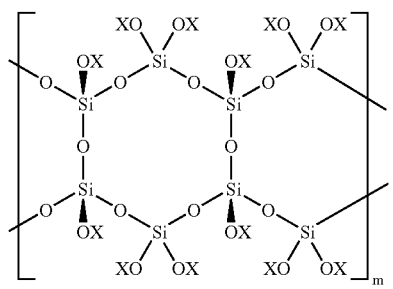

wherein,
X is an $SiR_3$ group, an H group, a $CH_3$ group, $C_2H_5$ group, an n-alkyl group, a branched alkyl group, an iso-alkyl group, an alkyl group substituted with an additional group, a polymer, a copolymer, a copolymer bonded to a rubber polymer, or a rubber polymer;
R is H, $CH_3$, $C_2H_5$, O—$SiR'_3$, alkyl, branched alkyl, iso-alkyl, alkene, alkyne, arene, an alkyl, alkene, alkyne or another polymer, R' is a polymer or an alkyl group substituted with an additional group; and
m is an integer from 1 to 60,000.

18. The method of claim 17, wherein X is $SiR_3$.

19. The method of claim 17, wherein the additional group is further defined as an alkyl group, a hydroxyl group, a carboxyl group, an epoxy group, an amine group, an alkene group, an alkyne group, a heteroatom or a group of heteroatoms.

20. A method for increasing traction of an article of manufacture on a surface comprising obtaining a composition comprising a pinacol polymer of the formula:

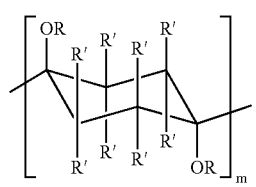

wherein
R is an H group, a $CH_3$ group, $C_2H_5$ group, an n-alkyl group, a branched alkyl group, an iso-alkyl group, or an alkyl group substituted with an additional group, a copolymer, a copolymer bonded to a rubber polymer, or a rubber polymer;
R' is independently an H group, a $CH_3$ group, Cl, F, Br, $C_xH_5$ group, or an alkyl, alkene, alkyne group or an alkyl group substituted with an additional group;

m is an integer from 1 to 21, and attaching the composition to the article of manufacture, wherein the composition increases traction of the article of manufacture on the surface.

21. The method of claim 20, wherein the additional group is further defined as an alkyl group, a hydroxyl group, a carboxyl group, an epoxy group, an amine group, an alkene group, an alkyne group, a heteroatom or a group of heteroatoms.

22. The method of claim 20, wherein m is an integer from 2 to 6.

23. A method for increasing traction of an article of manufacture on a surface comprising obtaining a composition comprising a pinacol polymer of the formula:

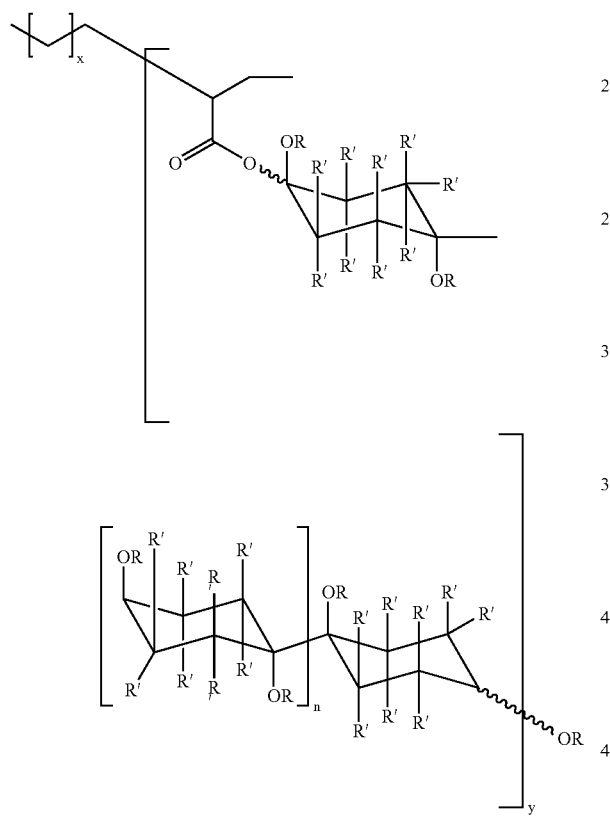

wherein,
R is an H group, a CH$_3$ group, C$_2$H$_5$ group, an n-alkyl group, a branched alkyl group, an iso-alkyl group, an alkyl group substituted with an additional group, a polymer, a copolymer, a copolymer bonded to a rubber polymer, or a rubber polymer;
R' is independently an H group, a CH$_3$ group, Cl, F, Br, C$_2$H$_5$ group, or an alkyl, alkene, alkyne group or an alkyl group substituted with an additional group;
n is an integer from 1 to 18;
x is an integer from 1 to 200,000;
y is an integer from 1 to 200,000, and
attaching the composition to the article of manufacture, wherein the composition increases traction of the article of manufacture on the surface.

24. The method of claim 23, wherein the additional group is further defined as an alkyl group, a hydroxyl group, a carboxyl group, an epoxy group, an amine group, an alkene group, an alkyne group, a heteroatom or a group of heteroatoms.

25. The method of claim 23, wherein n is an integer from 1 to 6.

26. A method for increasing traction of an article of manufacture on a surface comprising obtaining a composition comprising an indanol polymer of the formula:

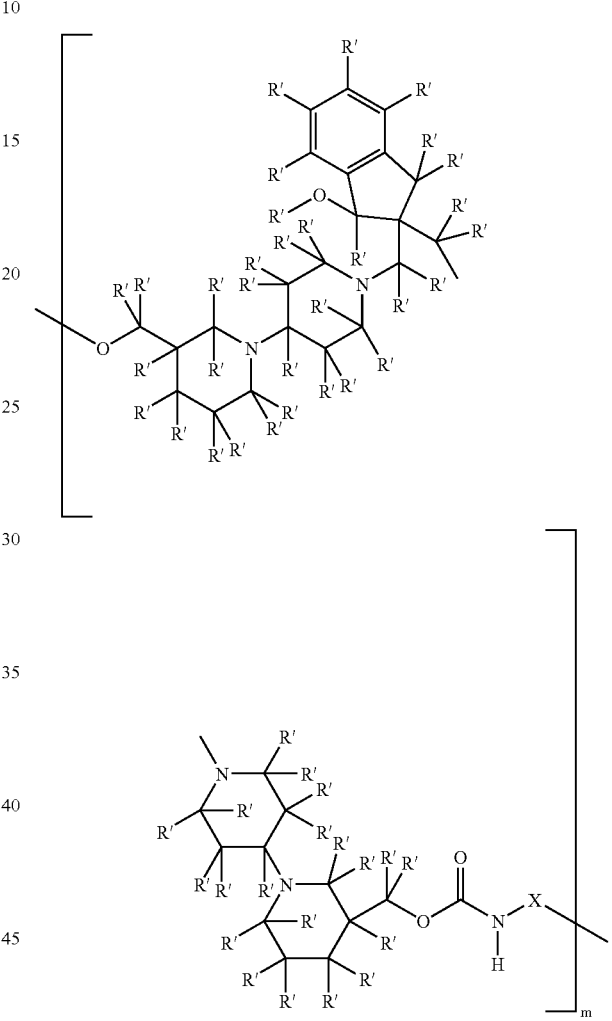

wherein,
X is a divalent alkyl, substituted alkyl, branched alkyl, n-alkyl, iso-alkyl, carboxyl, epoxy, amine, an alkene group, an alkyne group, or heteroatom group;
R is a H, CH$_3$, C$_2$H$_5$, a branched alkyl group, an n-alkyl group, an iso-alkyl group, or an alkyl group substituted with a hydroxyl, carboxyl, epoxy, amine, alkene, alkyne or heteroatom group, a polymer, a copolymer, a copolymer bonded to a rubber polymer or a rubber polymer;
R' is independently an H group, a CH$_3$ group, Cl, F, Br, C$_2$H$_5$ group, or an alkyl, alkene, alkyne group or an alkyl group substituted with an additional group; and
m is an integer from 1 to 40,000 and,
attaching the composition to the article of manufacture, wherein the composition increases traction of the article of manufacture on the surface.

27. A method for increasing traction of an article of manufacture on a surface comprising obtaining a composition comprising a phenol polymer of the formula:

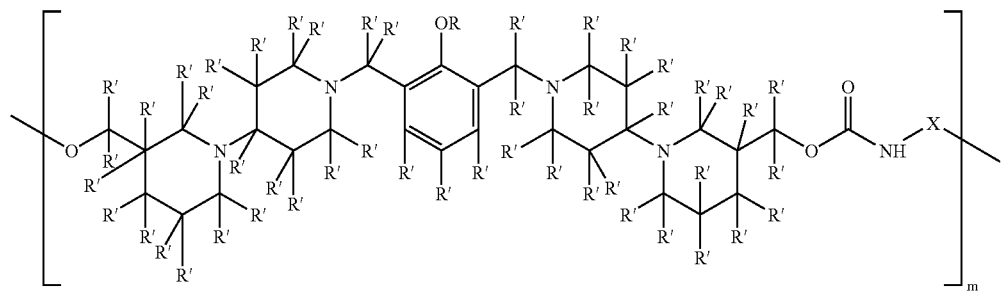

wherein,
X is a divalent alkyl, substituted alkyl, branched alkyl, n-alkyl, iso-alkyl, carboxyl, epoxy, amine, alkene, alkyne, or heteroatom group;
R is a H, $CH_3$ alkyl, substituted alkyl, a polymer, a copolymer, a copolymer bonded to a rubber polymer or a rubber polymer;
R' is a H, $CH_3$, alkyl, heteroalkyl, a substituted heteroalkyl, a polymer, a copolymer, a copolymer bonded to a rubber polymer or a rubber polymer; and
m is an integer from 1 to 40,000, and
attaching the composition to the article of manufacture, wherein the composition increases traction of the article of manufacture on the surface.

28. A method for increasing traction of an article of manufacture on a surface comprising obtaining a composition comprising a m-xylylene polymer of the formula:

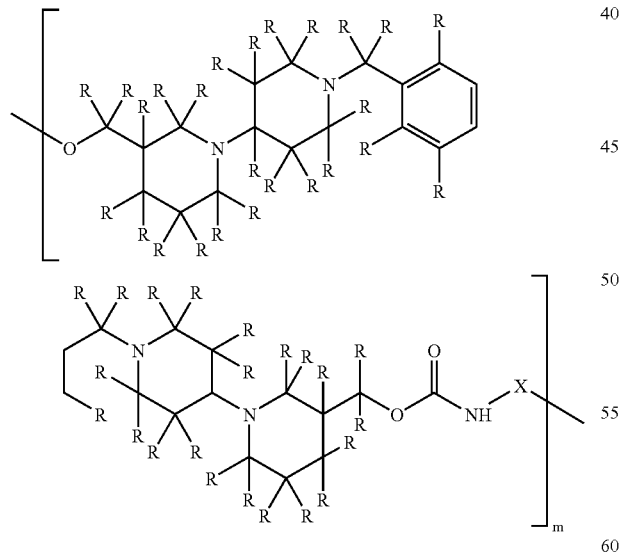

wherein,
X is a divalent alkyl, substituted alkyl, branched alkyl, n-alkyl, iso-alkyl, carboxyl, epoxy, amine, alkene, alkyne, or heteroatom group, a polymer, a copolymer, a copolymer bonded to a rubber polymer or a rubber polymer;

R is a H, $CH_3$, alkyl, heteroalkyl, a substituted heteroalkyl, a polymer, a copolymer, a copolymer bonded to a rubber polymer or a rubber polymer;
m is an integer from 1 to 40,000, and
attaching the composition to the article of manufacture, wherein the composition increases traction of the article of manufacture on the surface.

29. An article of manufacture comprising a silicate polymer of the formula:

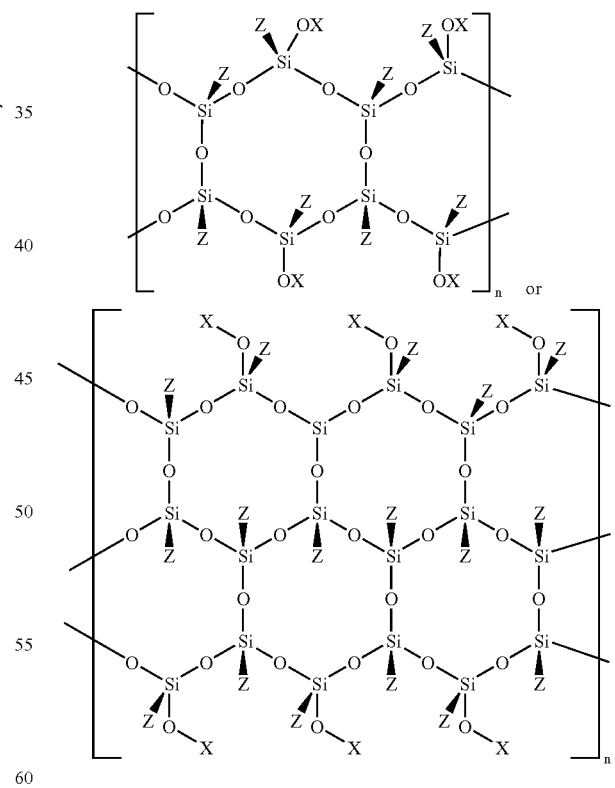

wherein,
X is an $SiR_3$ group, an H group, a $CH_3$ group, $C_2H_5$ group, an n-alkyl group, a branched alkyl group, an iso-alkyl group, a polymer, a copolymer, a copolymer bonded to a rubber polymer, a rubber polymer, or an alkyl group substituted with an alkyl group, a hydroxyl group, a carboxyl group, an epoxy group, an amine group, an alkene, an alkyne, an arene, and a heteroatom or a group of heteroatoms;

R is H, CH$_3$, C$_2$H$_5$, O—SiR'$_3$, n-alkyl, branched alkyl, iso-alkyl, alkene, alkyne, an alkyl, alkene, alkyne or an arene group;

R' is a polymer;

Z is an H group, a CH$_3$ group, a C$_2$H$_5$ group, a vinyl group, an n-alkyl group, a branched alkyl group, an iso-alkyl group, or an alkyl group substituted with an additional group;

n is an integer from 1 to 40,000 wherein the polymer is attached to the article of manufacture by a covalent bond, an ionic bond, a hydrogen bond or an adhesive.

30. The article of manufacture of claim 29, further defined as a tire, shoe, boot, glove, cane tip, or crutch tip, snowmobile tread, snowshoe, ice tong, ski pole, tank tread or shoe covering.

31. The article of manufacture of claim 30, further defined as a tire.

32. The article of manufacture of claim 29, wherein the silicate polymer has the structure:

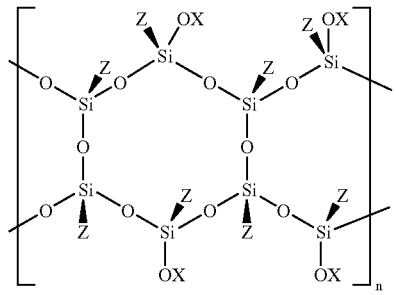

33. The article of manufacture of claim 29, wherein the silicate polymer has the structure:

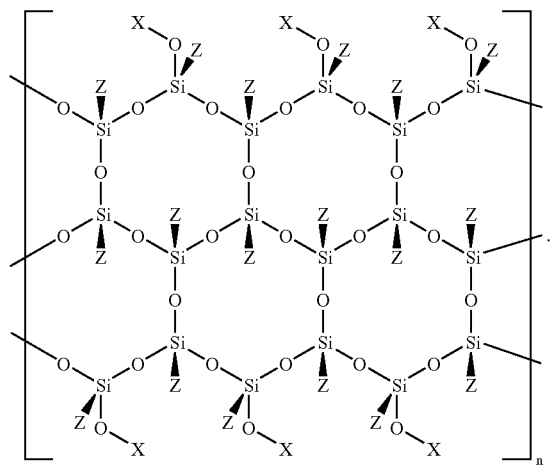

34. An article of manufacture comprising a silicate polymer of the formula:

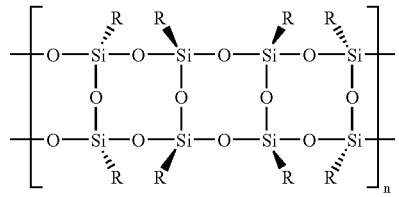

wherein:

R is CH$_3$ or (CH$_2$)3—NH$_2$, and n is an integer from 1 to 15,000 wherein the polymer is attached to the article of manufacture by a covalent bond, an ionic bond, a hydrogen bond or an adhesive.

35. The article of manufacture of claim 34, further defined as a tire, shoe, boot, glove, cane tip, or crutch tip, snowmobile tread, snowshoe, ice tong, ski pole, tank tread or shoe covering.

36. An article of manufacture comprising a plancheite-derived polymer of the formula:

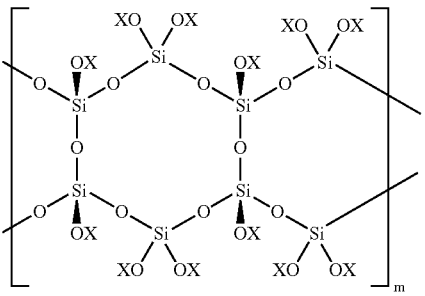

wherein,

X is an SiR$_3$ group, an H group, a CH$_3$ group, C$_2$H$_5$ group, an n-alkyl group, a branched alkyl group, an iso-alkyl group, an alkyl group substituted with an additional group, a polymer, a copolymer, a copolymer bonded to a rubber polymer, or a rubber polymer;

R is H, CH$_3$, C$_2$H$_5$, O—SiR'$_3$, alkyl, branched alkyl, iso-alkyl, alkene, alkyne, arene, an alkyl, alkene, alkyne or another polymer, R' is a polymer or an alkyl group substituted with an additional group; and m is an integer from 1 to 60,000 wherein the polymer is attached to the article of manufacture by a covalent bond, an ionic bond, a hydrogen bond or an adhesive.

37. The article of manufacture of claim 36, further defined as a tire, shoe, boot, glove, cane tip, or crutch tip, snowmobile tread, snowshoe, ice tong, ski pole, tank tread or shoe covering.

38. An article of manufacture comprising a pinacol polymer of the formula:

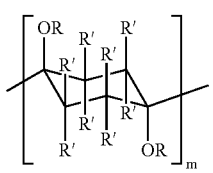

wherein,
- R is an H group, a CH₃ group, C₂H₅ group, an n-alkyl group, a branched alkyl group, an iso-alkyl group, or an alkyl group substituted with an additional group, a copolymer, a copolymer bonded to a rubber polymer, or a rubber polymer;
- R' is independently an H group, a CH₃ group, Cl, F, Br, C₂H₅ group, or an alkyl, alkene, alkyne group or an alkyl group substituted with an additional group; and
- m is an integer from 1 to 21 wherein the polymer is attached to the article of manufacture by a covalent bond, an ionic bond, a hydrogen bond or an adhesive.

39. The article of manufacture of claim 38, further defined as a tire, shoe, boot, glove, cane tip, or crutch tip, snowmobile tread, snowshoe, ice tong, ski pole, tank tread or shoe covering.

40. An article of manufacture comprising a pinacol polymer of the formula:

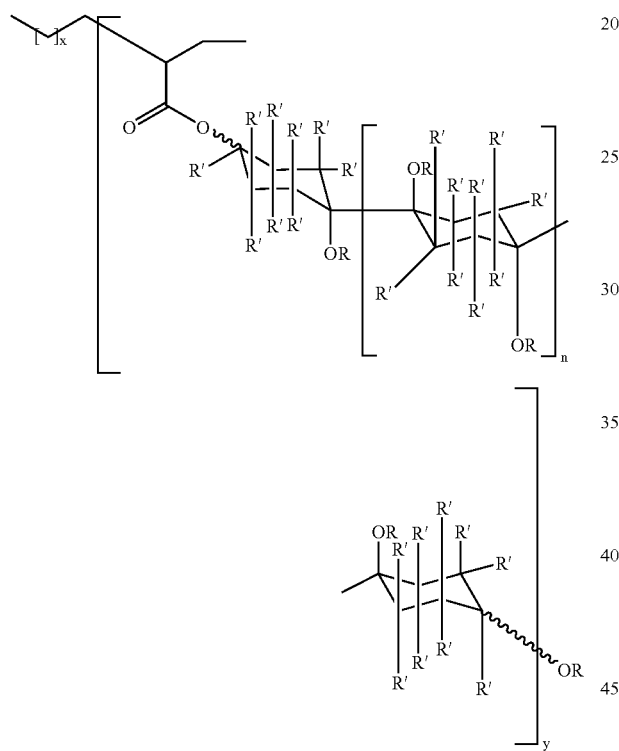

wherein,
- R is an H group, a CH₃ group, C₂H₅ group, an n-alkyl group, a branched alkyl group, an iso-alkyl group, an alkyl group substituted with an additional group, a polymer, a copolymer, a copolymer bonded to a rubber polymer, or a rubber polymer;
- R' is independently an H group, a CH₃ group, Cl, F, Br, C₂H₅ group, or an alkyl, alkene, alkyne group or an alkyl group substituted with an additional group;
- n is an integer from 1 to 18;
- x is an integer from 1 to 200,000; and
- y is an integer from 1 to 200,000 wherein the polymer is attached to the article of manufacture by a covalent bond, an ionic bond, a hydrogen bond or an adhesive.

41. The article of manufacture of claim 40, further defined as a tire, shoe, boot, glove, cane tip, or crutch tip, snowmobile tread, snowshoe, ice tong, ski pole, tank tread or shoe covering.

42. An article of manufacture comprising an indanol polymer of the formula:

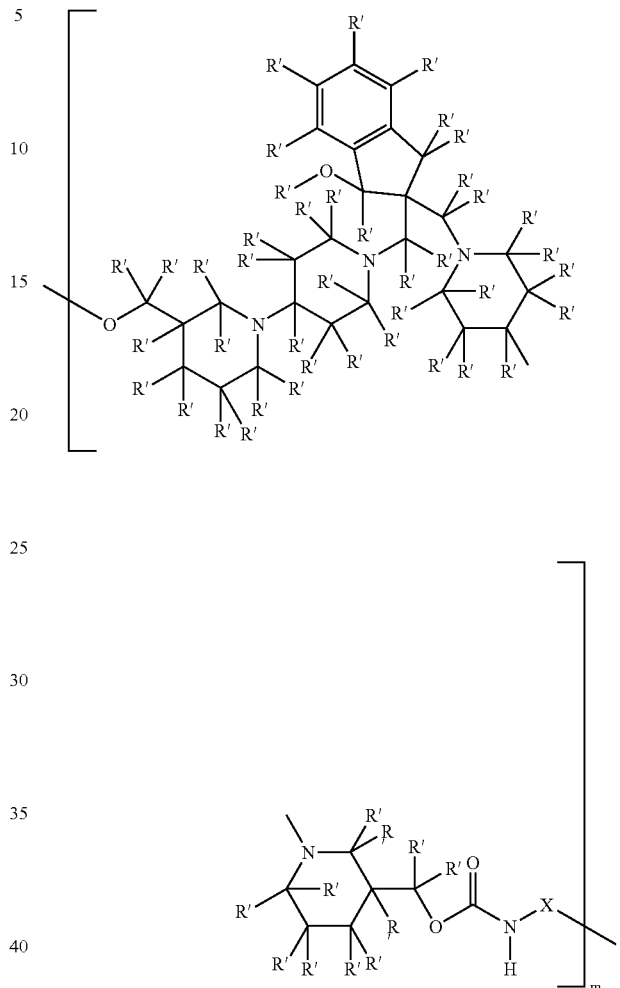

wherein,
- X is a divalent alkyl, substituted alkyl, branched alkyl, n-alkyl, iso-alkyl, carboxyl, epoxy, amine, alkene, alkyne, or heteroatom group;
- R is a H, CH₃, C₂H₅, a branched alkyl group, an n-alkyl group, an iso-alkyl group, or an alkyl group substituted with a hydroxyl, carboxyl, epoxy, amine, alkene, alkyne or heteroatom group, a polymer, a copolymer, a copolymer bonded to a rubber polymer or a rubber polymer;
- R' is independently an H group, a CH₃ group, Cl, F, Br, C₂H₅ group, or an alkyl, alkene, alkyne group or an alkyl group substituted with an additional group; and
- m is an integer from 1 to 40,000 wherein the polymer is attached to the article of manufacture by a covalent bond, an ionic bond, a hydrogen bond or an adhesive.

43. The article of manufacture of claim 42, further defined as a tire, shoe, boot, glove, cane tip, or crutch tip, snowmobile tread, snowshoe, ice tong, ski pole, tank tread or shoe covering.-

44. An article of manufacture comprising a phenol polymer of the formula:

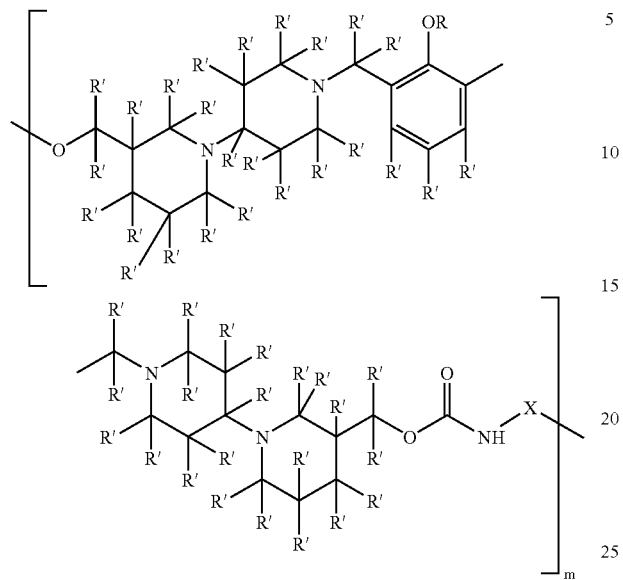

wherein,

X is a divalent alkyl, substituted alkyl, branched alkyl, n-alkyl, iso-alkyl, carboxyl, epoxy, amine, alkene, alkyne, or heteroatom group;

R is a H, $CH_3$ alkyl, substituted alkyl, a polymer, a copolymer, a copolymer bonded to a rubber polymer or a rubber polymer;

R' is a H, $CH_3$, alkyl, heteroalkyl, a substituted heteroalkyl, a polymer, a copolymer, a copolymer bonded to a rubber polymer or a rubber polymer; and m is an integer from 1 to 40,000 wherein the polymer is attached to the article of manufacture by a covalent bond, an ionic bond, a hydrogen bond or an adhesive.

45. The article of manufacture of claim 44, further defined as a tire, shoe, boot, glove, cane tip, or crutch tip, snowmobile tread, snowshoe, ice tong, ski pole, tank tread or shoe covering.

46. An article of manufacture comprising an m-xylylene polymer of the formula:

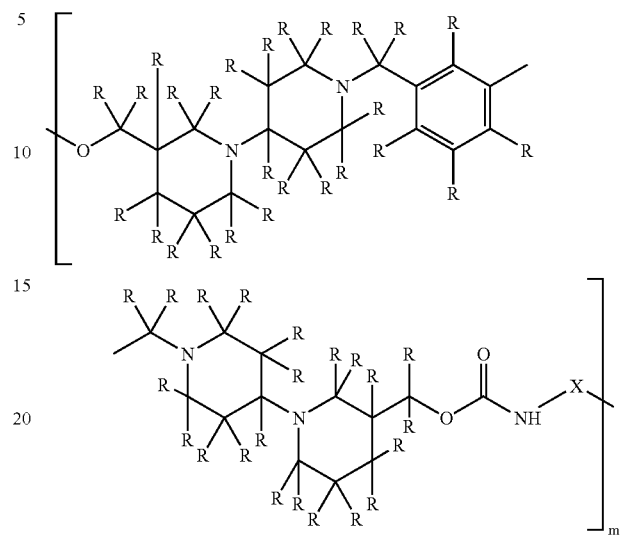

wherein,

X is a divalent alkyl, substituted alkyl, branched alkyl, n-alkyl, iso-alkyl, $CH_2$, carboxyl, epoxy, amine, alkene, alkyne, or heteroatom group, a polymer, a copolymer, a copolymer bonded to a rubber polymer or a rubber polymer;

R is a H, $CH_3$, alkyl, heteroalkyl, a substituted heteroalkyl, a polymer, a copolymer, a copolymer bonded to a rubber polymer or a rubber polymer; and m is an integer from 1 to 40,000 wherein the polymer is attached to the article of manufacture by a covalent bond, an ionic bond, a hydrogen bond or an adhesive.

47. The article of manufacture of claim 46, further defined as a tire, shoe, boot, glove, cane tip, or crutch tip, snowmobile tread, snowshoe, ice tong, ski pole, tank tread or shoe covering.

* * * * *

UNITED STATES PATENT AND TRADEMARK OFFICE
CERTIFICATE OF CORRECTION

PATENT NO. : 7,195,799 B2 Page 1 of 1
APPLICATION NO. : 10/896377
DATED : March 27, 2007
INVENTOR(S) : Penick It is certified that error appears in the above-identified patent and that said Letters Patent is hereby corrected as shown below:

In claim 23, column 33, lines 15-49, delete "##STR00024##" and insert

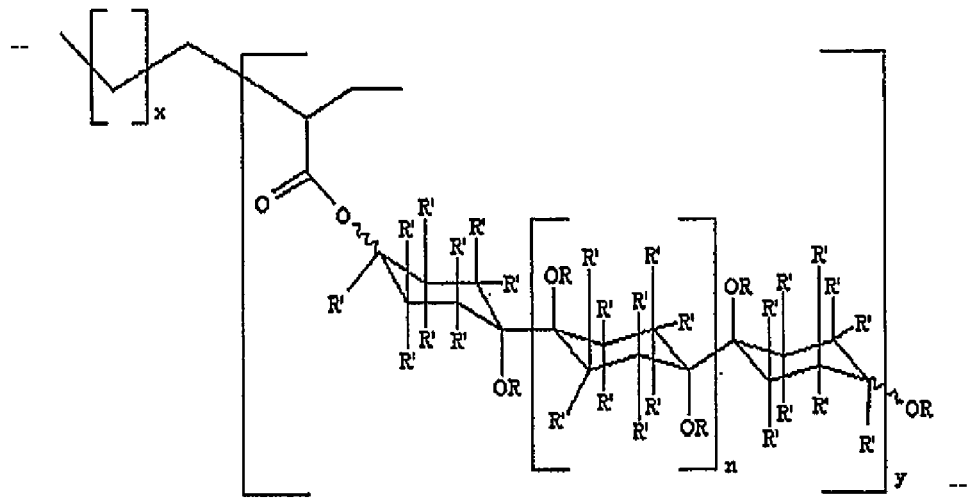

therefor.

Signed and Sealed this

Fifth Day of June, 2007

JON W. DUDAS
*Director of the United States Patent and Trademark Office*